Jan. 25, 1955 E. O. BLODGETT 2,700,445

TYPE ACTION FOR TYPEWRITERS

Original Filed Oct. 13, 1950 17 Sheets-Sheet 1

INVENTOR.
EDWIN O. BLODGETT
BY Robert S. Dunham
ATTORNEY

Jan. 25, 1955 E. O. BLODGETT 2,700,445

TYPE ACTION FOR TYPEWRITERS

Original Filed Oct. 13, 1950 17 Sheets-Sheet 2

INVENTOR.
EDWIN O. BLODGETT
BY Robert S. Dunham
ATTORNEY

TYPE ACTION FOR TYPEWRITERS

INVENTOR.
EDWIN O. BLODGETT
BY Robert S. Dunham
ATTORNEY

Jan. 25, 1955 E. O. BLODGETT 2,700,445

TYPE ACTION FOR TYPEWRITERS

Original Filed Oct. 13, 1950 17 Sheets-Sheet 4

INVENTOR.
EDWIN O. BLODGETT

BY Robert S. Dunham

ATTORNEY

INVENTOR.
EDWIN O. BLODGETT
BY Robert S. Dunham
ATTORNEY

Jan. 25, 1955 E. O. BLODGETT 2,700,445

TYPE ACTION FOR TYPEWRITERS

Original Filed Oct. 13, 1950 17 Sheets-Sheet 6

INVENTOR.
EDWIN O. BLODGETT
BY Robert S. Dunham
ATTORNEY

Jan. 25, 1955 E. O. BLODGETT 2,700,445

TYPE ACTION FOR TYPEWRITERS

Original Filed Oct. 13, 1950 17 Sheets-Sheet 7

INVENTOR.
EDWIN O. BLODGETT
BY Robert S. Durham
ATTORNEY

INVENTOR.
EDWIN O. BLODGETT

BY *Robert S. Dunham*

ATTORNEY

Jan. 25, 1955 E. O. BLODGETT 2,700,445

TYPE ACTION FOR TYPEWRITERS

Original Filed Oct. 13, 1950 17 Sheets-Sheet 9

INVENTOR.
EDWIN O. BLODGETT

BY Robert S. Dunham

ATTORNEY

INVENTOR.
EDWIN O. BLODGETT
BY Robert S. Dunham
ATTORNEY

INVENTOR.
EDWIN O. BLODGETT
BY Robert S. Dunham
ATTORNEY

Jan. 25, 1955 E. O. BLODGETT 2,700,445

TYPE ACTION FOR TYPEWRITERS

Original Filed Oct. 13, 1950 17 Sheets-Sheet 12

INVENTOR.
EDWIN O. BLODGETT

BY Robert S. Dunham

ATTORNEY

INVENTOR.
EDWIN O. BLODGETT
BY Robert S. Dunham
ATTORNEY

TYPE ACTION FOR TYPEWRITERS

Original Filed Oct. 13, 1950

INVENTOR.
EDWIN O. BLODGETT
BY Robert S. Dunham
ATTORNEY

Jan. 25, 1955 E. O. BLODGETT 2,700,445

TYPE ACTION FOR TYPEWRITERS

Original Filed Oct. 13, 1950 17 Sheets-Sheet 15

INVENTOR.
EDWIN O. BLODGETT
BY Robert S. Dunham
ATTORNEY

INVENTOR.
EDWIN O. BLODGETT
BY Robert S. Dunham
ATTORNEY

TYPE ACTION FOR TYPEWRITERS

Original Filed Oct. 13, 1950 17 Sheets-Sheet 17

INVENTOR.
EDWIN O. BLODGETT
BY Robert S. Dunham
ATTORNEY

United States Patent Office 2,700,445

Patented Jan. 25, 1955

2,700,445

TYPE ACTION FOR TYPEWRITERS

Edwin O. Blodgett, Rochester, N. Y., assignor to Commercial Controls Corporation, Rochester, N. Y., a corporation of Delaware Original application October 13, 1950, Serial No. 189,980. Divided and this application March 21, 1952, Serial No. 277,744

5 Claims. (Cl. 197—17)

This invention relates to typewriter structures. The invention herein was conceived in connection with the tape controlled typewriter of my application for patent, Serial No. 189,980, filed October 13, 1950, of which this application is a division, and in which application is shown and claimed a typewriter in which a control tape is coded by perforating, and in which such control tape is then used for the automatic control of the typewriter in reproducing copy.

The machine of my parent application includes a power operated typewriter having code selecting mechanism operative upon depression of a key lever to select a code representative of the character controlled by such lever, together with a tape punch controlled by the key controlled selector for producing combinational code perforations in a control tape. The machine also includes means for sensing a tape perforated as stated and for translating such perforations to the end that the power operated type action of the typewriter may be under the control of the perforated tape for transcribing text in printed form.

Automatically operated typewriters of the kind to which the parent application relates are frequently used for the composition of copy useful in various reproduction processes such as photo-lithography, for example. It is, therefore, important that the printed impressions on a page be uniform so that the reproduced copies may also be of uniform character. In order to obtain uniform type impressions, it is necessary that the type actions be adjustable so that the impact of each type face upon the copy paper be the same as the impact of each other type face.

It is, accordingly, an object of the invention to provide an improved type action for power operated typewriters which includes a toggle linkage having means for adjusting the effective length thereof.

It is a further object of the invention to provide a type action toggle linkage which provides in itself an effective lock against rebound action of the type levers.

It is a further object of the invention to provide for a very fine adjustment of the type action by providing means for making the effective length of a single element of each toggle linkage system either longer or shorter as the character of the particular impression may require.

The foregoing objectives are attained in a power operated typewriter by providing a connecting link between a rocking portion of the power cam frame and the sublever of the type action linkage, which connection may be adjusted whereby the effective length of the type action may be altered. Furthermore, a type bar operating toggle element of the type action is herein provided with means to adjust the effective length of such individual toggle element.

Specific objects, features and advantages of the invention will become clear as the description of the machine is read in light of the drawings in which.

Figures 19, 20, 21:
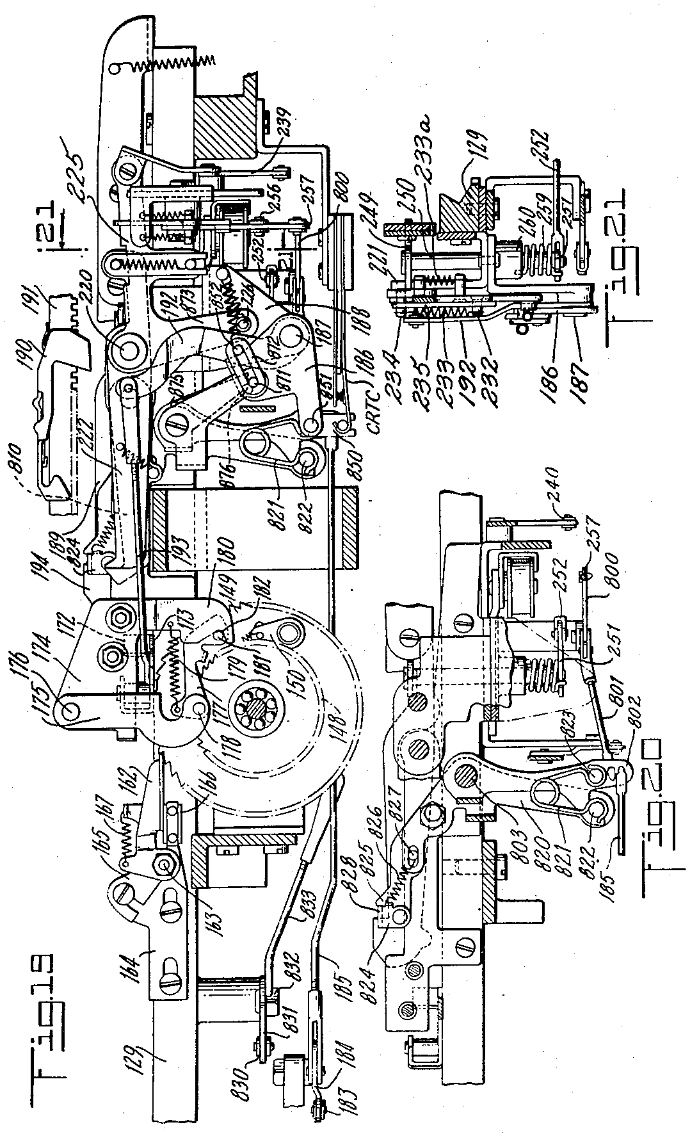
Fig. 19 is a rear elevation of the tabulating and carriage releasing mechanism.
Figure 19A:
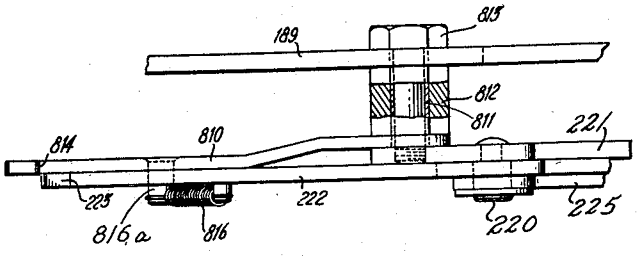
Figure 19B:
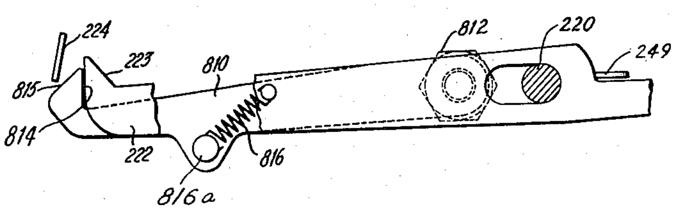
Figure 20A:
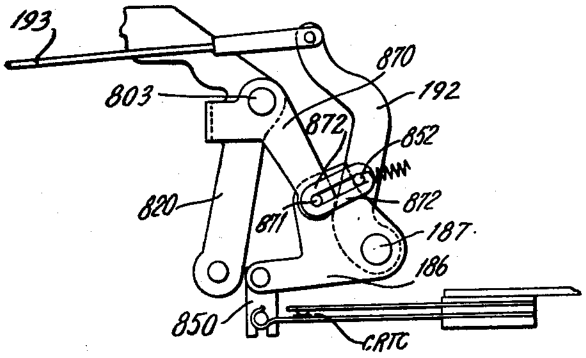
Figure 20B:
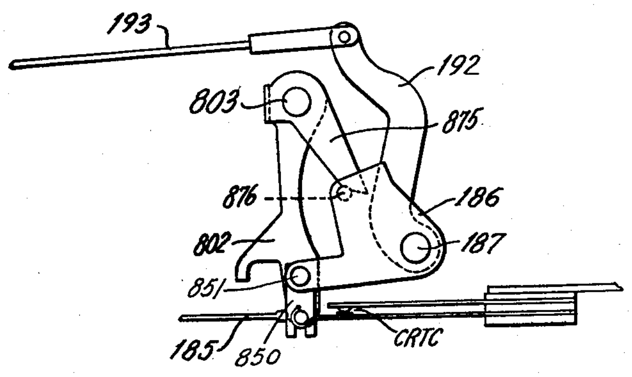
Figure 22:
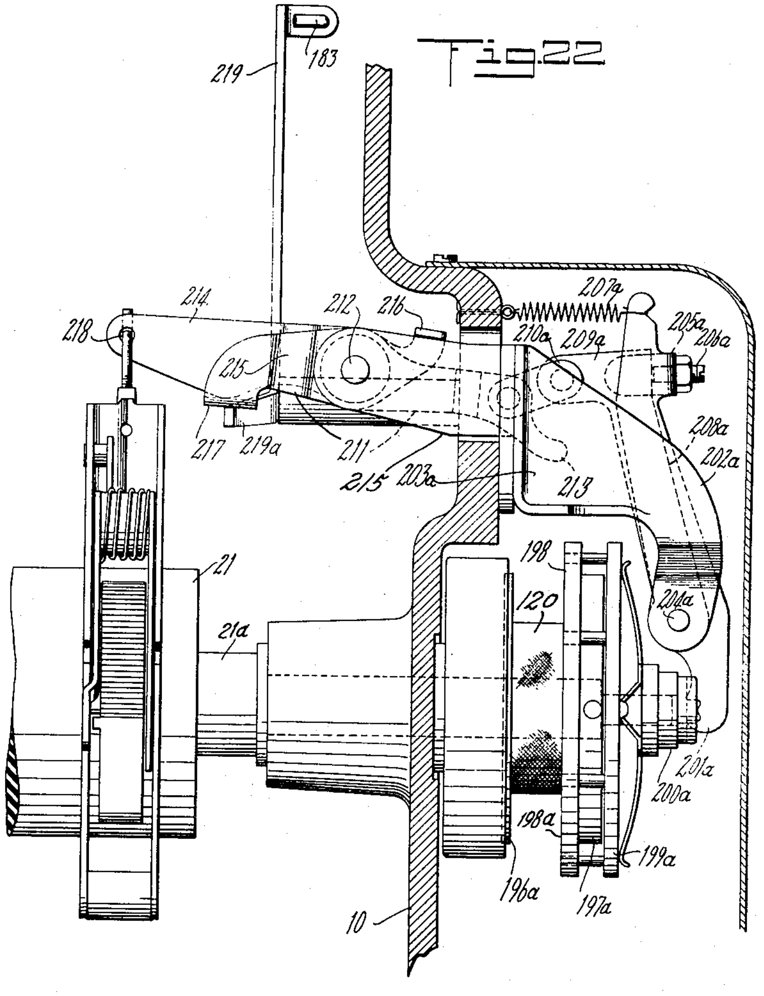
Figure 23:
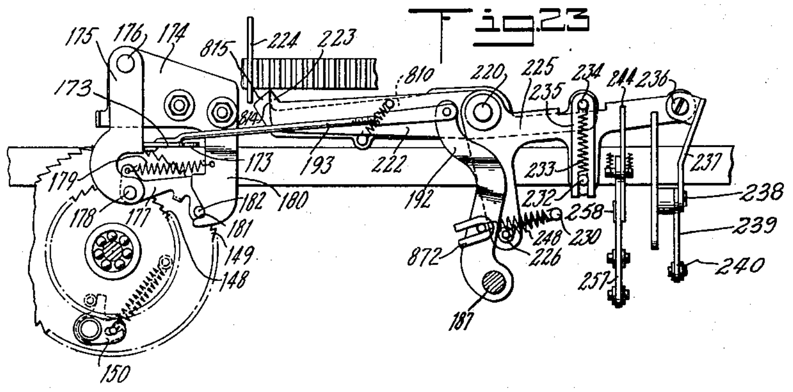
Figure 24:
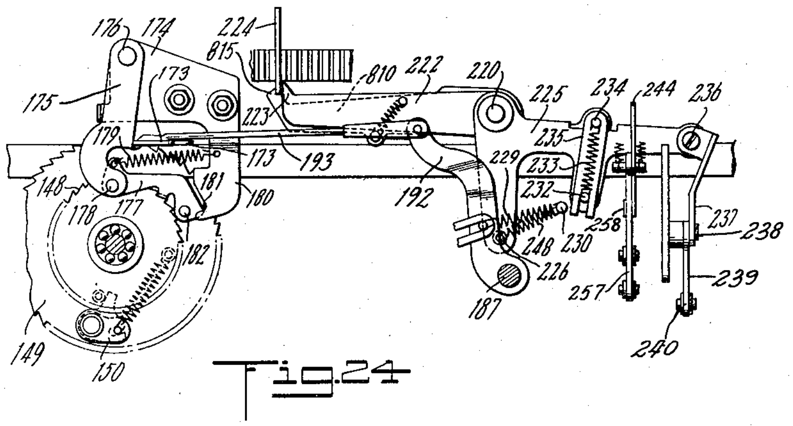
Figures 25, 26:
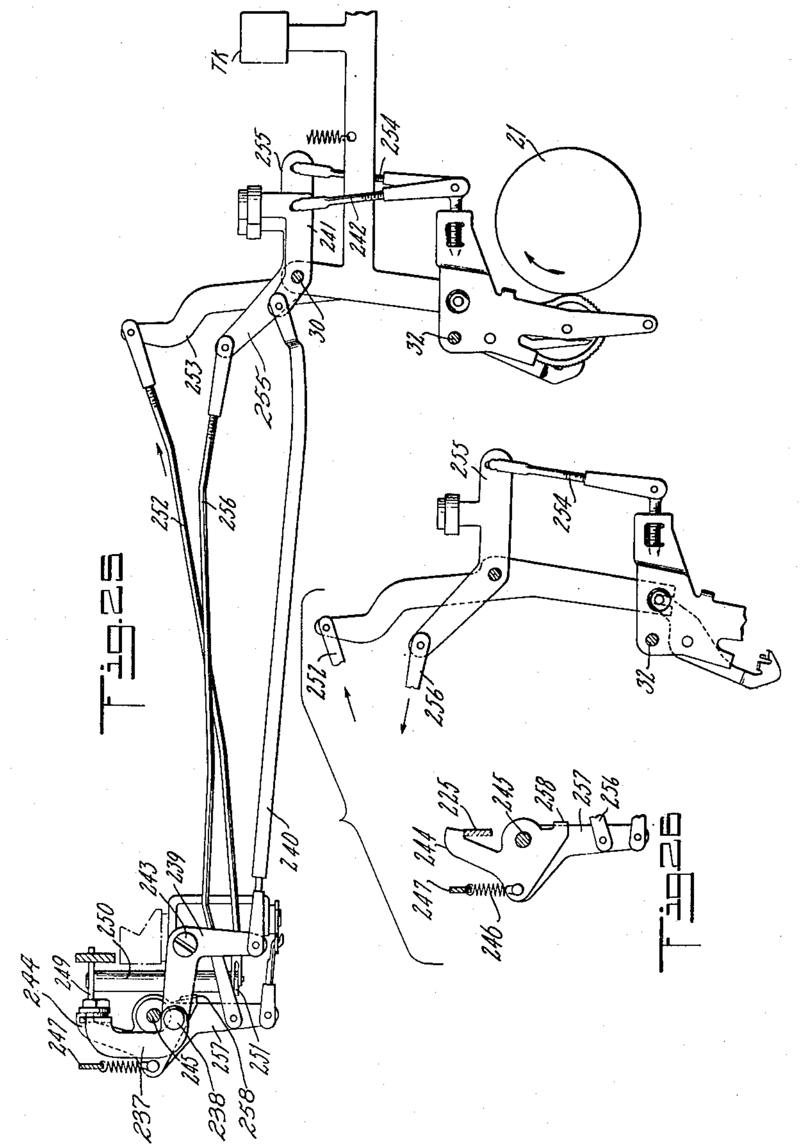
Figure 27:
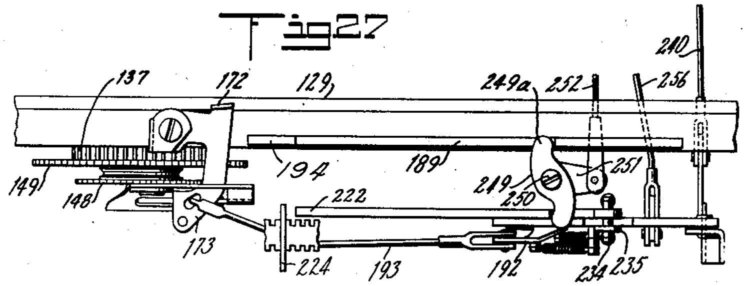

Fig. 19*a* is a fragmentary plan view made in section of Fig. 19 showing the carriage rebound latch;

Fig. 19*b* is a fragmentary elevational view of the rebound latch shown in Fig. 19*a*;

Fig. 20 is a rear elevation of a part of the carriage release and tabulating mechanism, certain parts having been removed to show underlying structure;

Fig. 20*a* is a fragmentary detail in elevation of the carriage return linkage of Fig. 19 arranged to operate a carriage return contact;

Fig. 20*b* is a fragmentary view in elevation of the linkage shown in Fig. 19 for operating a carriage control contact during line spacing operations;

Fig. 21 is a sectional view on line 21—21 of Fig. 19;

Fig. 22 illustrates the carriage return control clutch and its associated operating mechanism, the view being along the clutch axis;

Fig. 23 is a rear plan view of the tabulating mechanism showing the parts in one position of operation;

Fig. 24 is a rear plan view of the tabulating mechanism shown in Fig. 23, but showing the parts thereof in a different position of operation;

Fig. 25 is a vertical section transversely of the platen carriage of the writing machine, including tabulating key linkage and power mechanism;

Fig. 26 shows a tabulating release lever latch and its associated operating linkage;

Fig. 27 is a plan view of the tabulating mechanism shown in Fig. 23; and

Figure 28:
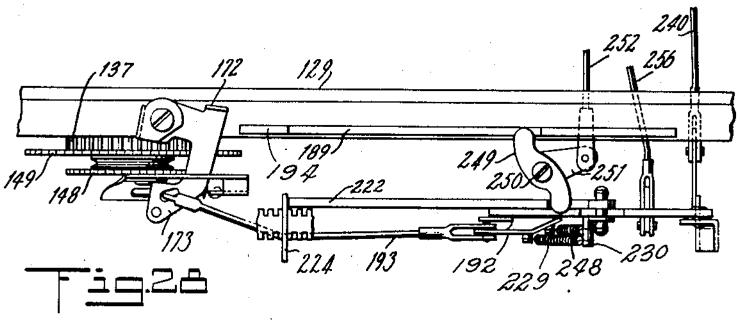

Fig. 28 is a plan view of the tabulating mechanism shown in Fig. 24.

*Power frame and type action*

The machine is assembled around a sturdy four-sided base 10 formed by a right and left aluminum casting joined at the front by another aluminum casting and at the rear by an angular steel plate 11 extending over the top rear portions of the side castings to brace the entire assembly. A power frame assembly 12, a code selector 13 and a code translator 14 are mounted between the two side castings. A tape punch 15 and a tape reader 16 are mounted on the left hand side of the frame. A carriage and rail assembly is mounted between the top rear portions of the two side castings, and a space at the rear of the carriage is provided for auxiliary apparatus.

A single, constant speed 1/20th H. P. motor 17 is mounted on the inner face of the rear frame plate 11, and this motor is connected by a V-belt 18 to a power shaft 19. Power shaft 19 is connected by means of a chain drive 20 to a continuously rotating power roll 21 which is adapted to operate the type bars through a conventional cam arrangement as will be more fully pointed out. The motor 17 is also connected to drive the tape punch 15, the tape reader 16 and the translating mechanism 14. This drive is achieved through a series of gears as follows. The power shaft 19 through gear 22 drives a gear 23 on the drive shaft of the tape punch 15. A gear 24 fixed to the power roll shaft is in mesh with a gear 25 on the drive shaft of the tape reader 16. A pair of gears 26 imparts driving power to the code translator mechanism 14. The individual gears for driving each of these units not only afford the proper relative speeds, but also permit easy removal of each unit from the base.

Figure 1:
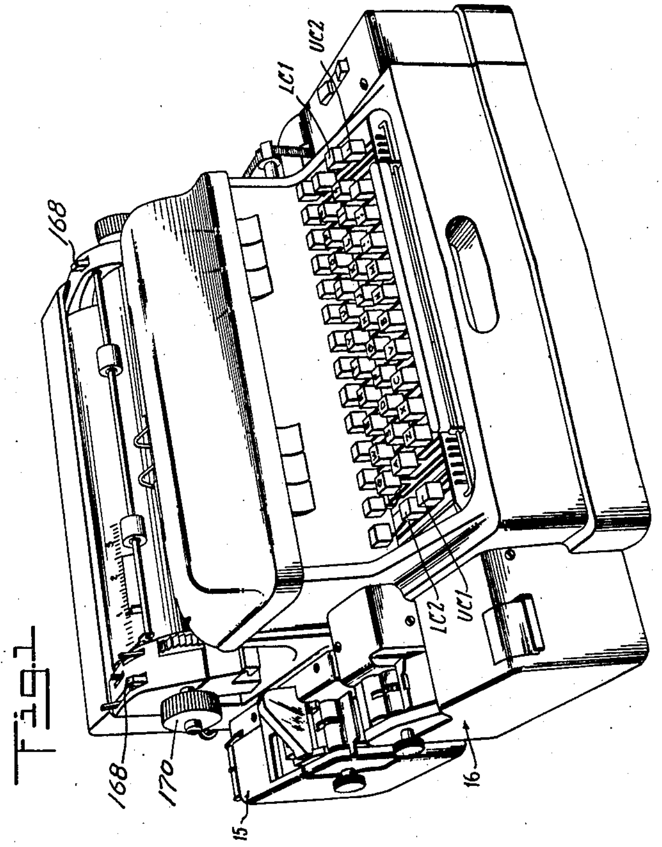
Fig. 1 is an exterior perspective view of the writing machine constituting the invention.
Figure 2:
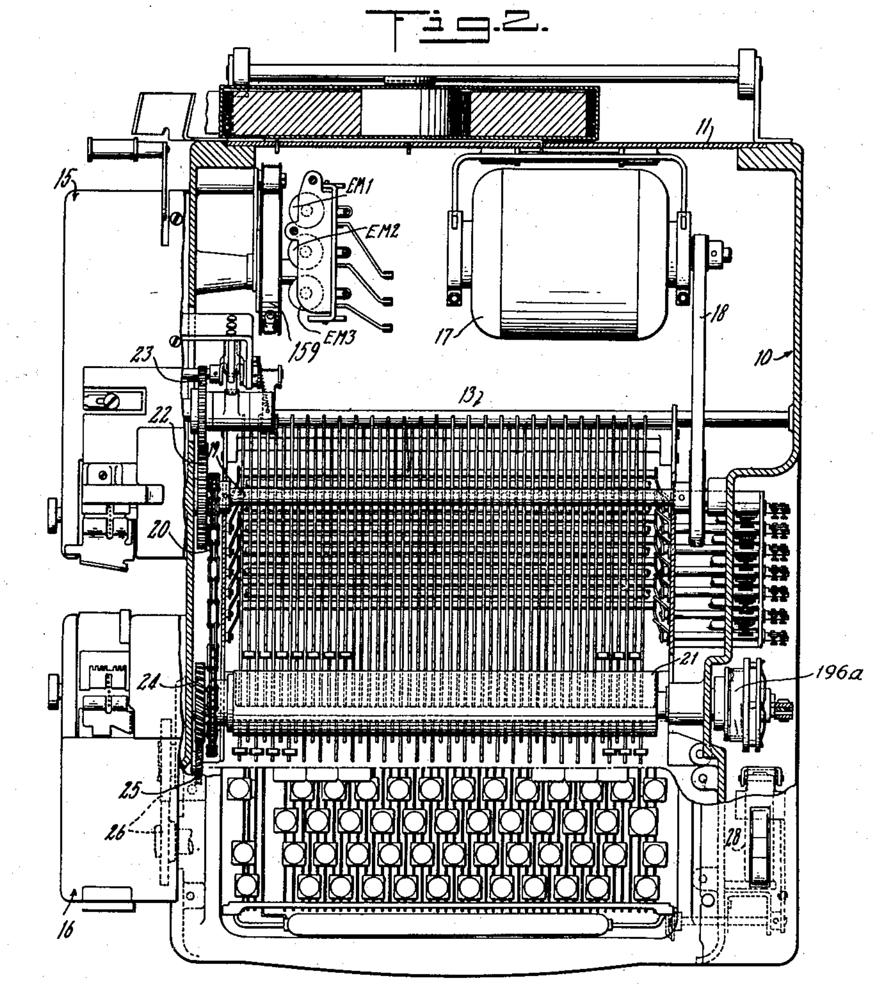
Fig. 2 is a horizontal sectional view through the machine at a point just above the keyboard.

The power frame 12 which is mounted within the base 10 has assembled thereon the key levers 27 and the power operated type actions. The key levers 27 are operable to control their associated power cams with a minimum of effort. The manner in which the operating cams are energized by the power roll 21 will appear more fully hereinafter. A normally energized magnetic lock 28 (Fig. 2) adapted to rock a key lever locking bail 29 (see Fig. 3) is provided to prevent effective operation of the keys when the power for any reason is off, or when the keys should not be operated for any other reason.

Each key lever controls a cam assembly contacting with the constantly running power roll 21 whereby each lever control cam furnishes the power for operating a type bar through a bell crank and, in addition, operates a slide of the code selector mechanism 13.

The manner in which power is imparted to the operative mechanism of the machine will be only briefly described since the arrangement is generally shown in the International electric writing machine formerly known as the "Electromatic." It is in connection with electric writing machines of this type that the invention has been disclosed. However, it will be understood that the invention is not limited in application to the specific machine selected for purpose of illustration, but may be applied to other power operated writing machines.

Figure 3:
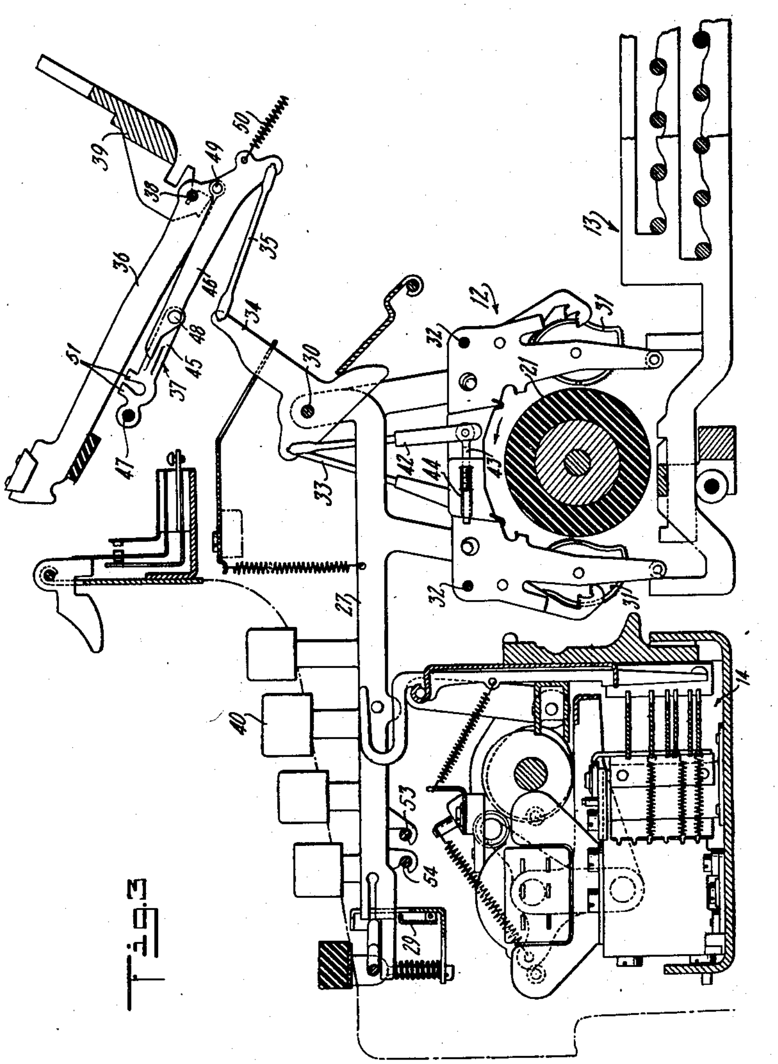
Fig. 3 is a vertical sectional view through the keyboard, the power roller, and the type basket.

As shown in Fig. 3 of the drawings the key levers 27 are pivoted on a rod 30 which is supported by a cross member of the power frame assembly. The power roller 21 is mounted under the power frame assembly for rotation in the direction of the arrow (Fig. 3) by means of the drive connections to the motor previously described.

Cooperating with the power roll 21 are cam units 31 which are pivotally mounted on rods 32 extending parallel with the power roller 21. There is a cam unit 31 associated with each key lever 27 and each cam unit in control of a type bar is connected by a link 33 with a bell crank 34 pivoted on rod 30. The bell cranks 34 are connected by links 35 to the type bars 36 through the medium of toggles 37. The type bars 36 are pivoted on the usual wire segment 38 provided on a type bar segment 39 located in front of the conventional platen. The platen, as will appear hereinafter, is rotatably mounted in a carriage which is supported on front and rear rails by means of suitable anti-friction roller trucks.

Figure 15:
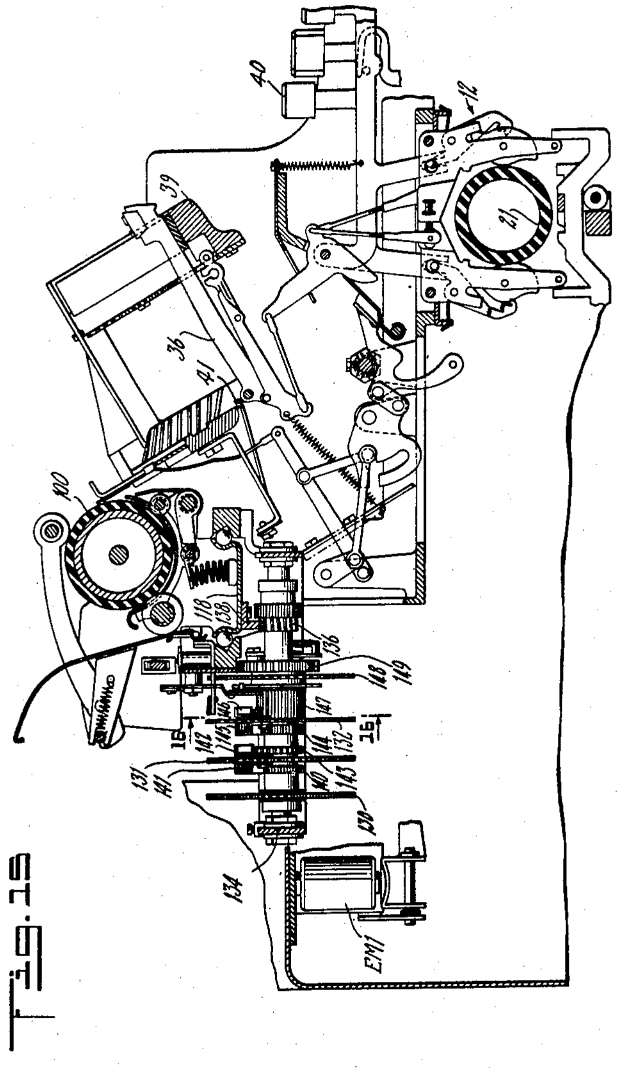
Fig. 15 is a vertical sectional view through the power roller, the type basket, the carriage and the escapement mechanism.

When any character key 40 is depressed, its cam unit 31 is caused to operably engage the power roller 21 in a well known way, thereby rocking the cam unit 31 clockwise or counterclockwise, according to whether the operative cam unit is pivoted on the left or on the right hand rod 32, respectively. The rocking of the cam unit causes its link 33 or 42 (for the cam units on the right and left respectively, Fig. 3) to be drawn downwardly, thereby rocking the corresponding bell crank 34. This movement of the bell crank 34, through the corresponding link 35 and toggle 37, causes type bar 36 associated with the selected key to rock in a printing stroke and to make an impression of the type upon a work sheet carried about the platen. The type bar 36, near the end of its operative stroke, engages and actuates the usual universal bar 41 (Fig. 15).

It may be pointed out that the operating linkage for the type bars 36 which has just been described includes several novel features which render the linkage system adjustable to secure an optimum and a uniform impression of the type. In Fig. 3 of the drawings, it will be noted that the downwardly depending link 42 is connected to its cam assembly 31 (at the left, Fig. 3) at the forward or keyboard side of the power roll by means of a threaded pin 43, which is pivoted at one end to the link 42 and which is adjustably threaded at its other end into a socket 44 in the horizontal leg of the cam unit frame. The links depending downwardly from the bell cranks 34 are composed of two sections which are screwed into each other, thereby providing a further adjustment by means of which the associated cams may be accurately spaced with respect to the power roll. It will appear, therefore, that the leverage asserted through the link and the cam unit may be adjusted through the threaded pin 43. It may also be pointed out that the toggle 37 consisting of arms 45 and 46 is so arranged as to effectively inhibit rebound action of the type bars 36. One end of the arm 45 of the toggle is mounted on a fixed pivot rod 47, while the other end is pivoted to the arm 46 by means of a pivot pin 48. The operative connection of the arm 46 of the toggle to the type bar 36 is at a pivot pin 49. The operation of the toggle mechanism is stabilized by a spring 50 which is attached to the toggle arm 46 at one of its ends and to a fixed frame member at its other end. It will be observed that when the toggle linkage 45—46 is in its extended position the points 47, 48 and 49 are in a substantially straight line so that upon return of the type bar 36 to its position of rest, as shown in Fig. 3 of the drawings, the toggle linkage will in effect constitute a lock against the rebound action of the type bar 36. A fine adjustment of the toggle linkage may be obtained by either slightly shortening the arm 45 or by lengthening it. Such alteration of the arm 45 is easily achieved by either springing apart, or closing a pair of ears 51 which constitute the legs of a generally U-shaped portion of the arm 45.

*Case shift*

Figures 4, 5:
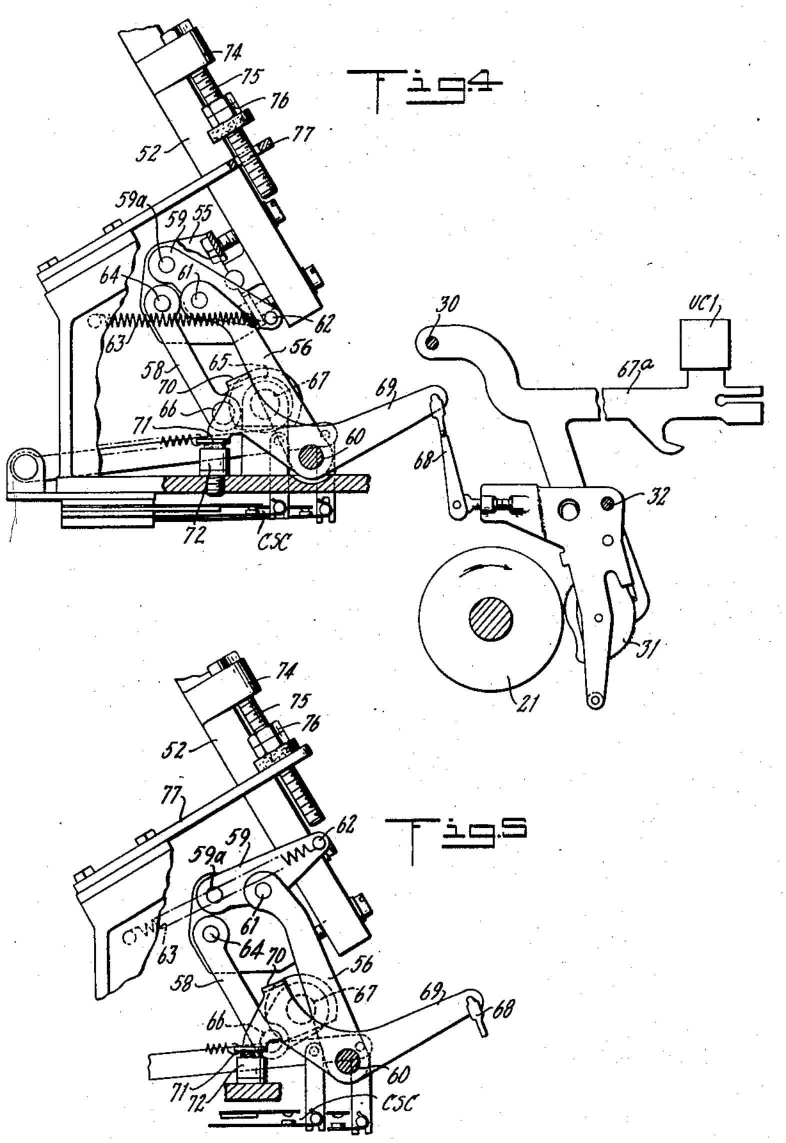
Fig. 4 is a detail view of toggle mechanism for shifting the type basket to lower case position.
Fig. 5 is a view similar to Fig. 4 and shows the toggle linkage in the released position assumed when the type basket is in upper case position.
Figures 6, 7:
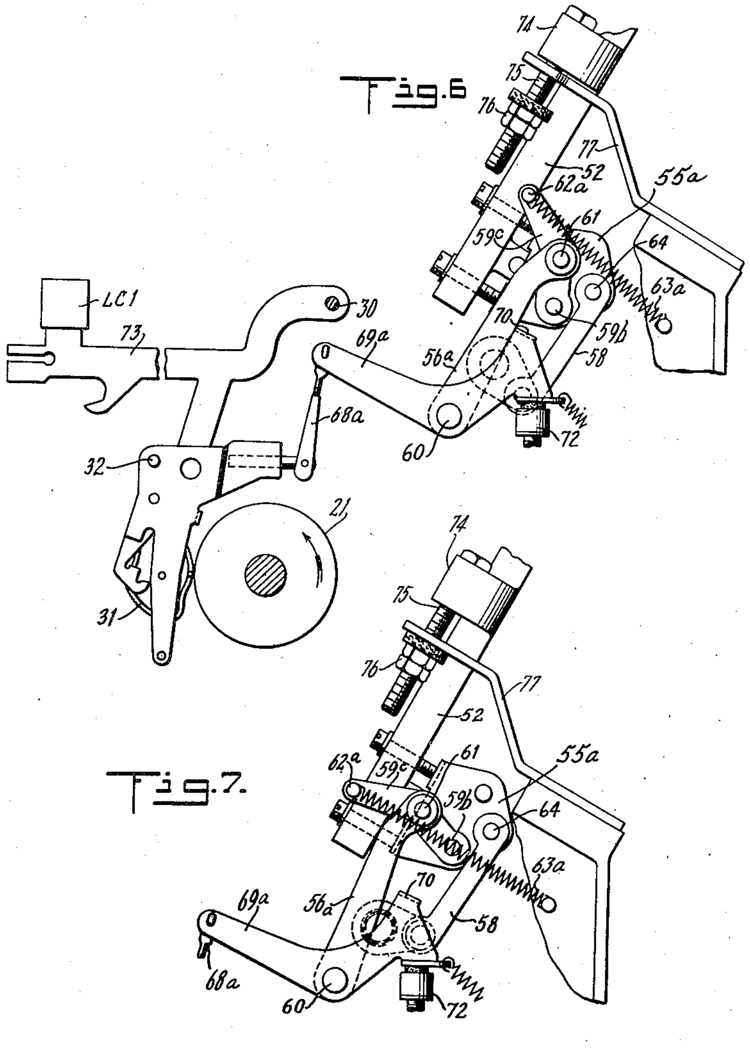
Fig. 6 is a detail view of the toggle mechanism for shifting the type basket to upper case position.
Fig. 7 is a view similar to Fig. 6 but shows the toggle linkage in the released position which it assumes when the basket is shifted to lower case position.

The type basket 52, see Figs. 4, 5, 6 and 7, is mounted for selective shifting between upper and lower case printing positions by mounting the same on two sets of parallel leaf springs in the well known manner. For the purpose of shifting the type basket, there has been provided herein improved power operated mechanism. A key lever and cam assembly is provided for shifting the basket to one position, and a separate key lever and cam assembly is provided for shifting it to the other position. This provides positive, fast, automatic operation of the type basket shift for selectively printing upper or lower case characters under the control of the code translator mechanism 14. Two oppositely disposed toggle mechanisms adjustably hold the basket in its two shifted positions, and the power from each basket shift cam unit is applied to move the basket by breaking its associated toggle. This imparts an easy, accelerated motion to the basket. Specifically, the manner in which the type basket is shifted from one position to another will be seen by reference to Figs. 4–7, wherein Figs. 4 and 5 illustrate the shifting mechanism at the left side of the type basket and Figs. 6 and 7 illustrate the shifting mechanism at the right side of the basket. Furthermore, Figs. 4 and 7 show the position of the shifting mechanism at the left and right side of the basket, respectively, when the basket has been moved upwardly for printing lower case characters, while Figs. 5 and 6 show the position of the mechanism at the left and right side, respectively, when the basket has been moved downwardly for printing of upper case characters. A lower case key LC1 is disposed at the right hand side of the keyboard, and depression of this key will operate a cam assembly as will be pointed out hereinafter. The key LC1 is connected by means of a transverse bail 53 (Fig. 3) with a lower case shaft key LC2 disposed at the left hand side of the keyboard. An upper case shift key UC1 is disposed at the left hand side of the keyboard and depression of this key will operate an associated cam assembly, as will be pointed out hereinafter. The upper case shift key UC1 is attached to an upper case shift key UC2 which is disposed at the right hand side of the keyboard by means of a transverse bail 54. It will appear, therefore, that depression of either of the case shift keys LC1 or LC2 on the one hand or UC1 or UC2 on the other hand will effect a shifting movement of the type basket.

Fig. 4 of the drawings shows the type basket 52 in its upper position in which lower case characters are printed. To the rear face of a side frame member of the basket 52 is attached a bracket 55 by means of a pair of screws, and to the bracket 55 are pivoted toggle levers 58 and 59. One end of a third toggle lever 56 is pivoted on a shaft 60, while the other end of the lever 56 is pivoted to the lever 59 at an intermediate point thereof by means of a pivot pin 61. The free end of the lever 59 has a stud 62 extending from a face thereof to which is attached a spring 63 which is anchored at its other end to a fixed frame member. The other end of the lever 59 is pivoted to the bracket 55 by means of a pivot pin 59*a*. The lever 58 of the toggle system has one end thereof pivoted on a pivot pin 64 carried by the bracket 55. The opposite end of the lever 58 is pivoted to a short lever 65 by means of a pivot pin 66, the short lever 65 being secured to a rock shaft 67.

The toggle system as it is disposed in Fig. 4, when the type basket is elevated to its lower case position, has the pivot points 59*a*, 60 and 61 of the toggle system in substantial alignment and the spring 63 under substantial tension, and is effective to exert considerable turning force on a finger 70 which holds the toggle levers 59 and 56 in their straightened relation, as shown in Fig. 4, wherein the lever 56 engages the finger 70 of a release lever 69 which is in turn stopped by extension 71 and stop 72. This positively holds the basket in its upper position. The arrangement at the other side of the basket has a like funtion.

In order to release the basket 52 to its lower position for the printing of upper case characters, it is merely necessary to depress either key UC1 or UC2 to rock the key lever 67*a* about the rod 30, whereby its associated cam assembly is brought into contact with the power roll 21 and a connecting link 68 is thereby drawn downwardly. The toggle release lever 69 is pivoted for rocking movement about the rock shaft 60 and the upper free end of the release lever 69 has an inturned finger 70 which abuts the edge of the lever 56 to rock the same in a clockwise direction to break the toggle linkage into the position shown in Fig. 5 of the drawings. The release lever 69 has an extension 71 which is adapted to contact a stop member 72 when the release lever and its associated cam assembly are in normal or non-operated position.

As viewed in Fig. 5 of the drawings the case shift toggle linkage is in its released position wherein the force of the spring 63*a* is directed along a line from its point of anchorage 62*a* through the pivot point 59*b* of the lever 59*c*. In this position the effect of the spring is substantially neutralized.

When the type basket is in its upper case position, the operating toggle at the right hand side of the basket is as shown in Fig. 6 of the drawings, while its position at that side of the basket for lower case printing is shown in Fig. 7 of the drawings. The toggle linkage at the right side of the basket which controls the shifting of the basket into the lower case position is in all respects similar to the shifting mechanism at the left hand side of the basket with the exception that the position of the lever 59 is reversed to that of lever 59*c*. That is to say, the pivot point 59*a* of Figs. 4–5 is disposed as shown at 59*b*, Figs. 6–7, at the bottom edge of the bracket 55*a* while the free end of the lever 59*c* extends upwardly when the toggle system is in its extended or operative position. If, therefore, the basket is in its upper case position (Fig. 6) and it is desired to shift the same to lower case position (Fig. 7), it is merely necessary to depress the lower case shift key LC1 and its associated key lever 73 to rock the lever downwardly about the rod 30. This will effectively release its cam assembly for contact with the power roll 21 with the result that the link 68*a* is moved downwardly and the release lever 69*a* will be rocked into contact with the toggle lever 56*a* so that the toggle system will be broken into the position shown in Fig. 7 of the drawings where the force of the spring 63*a* extends substantially from its point of connection 62*a* with the lever 59*c* through the pivot point 59*b* whereby its effect on the toggle linkage is substantially nullified.

The type basket 52 has lugs 74 extending forwardly from each side thereof, and these lugs carry stop screws 75 on which stop nuts 76 are threaded. The stop nuts 76 at the left side of the basket are adapted in the upper case position (Fig. 5) to contact the face of a stop bar 77 fixed to and extending forwardly from a portion of the power frame. The stop nuts 76 at the right hand side of the basket are adapted in the lower case position (Fig. 7) to contact the lower face of the stop bar 77 at the right hand side of the basket. The movement of the type basket 52 may, therefore, be accurately limited by adjusting the stop nuts 76, the pair at the left hand side of the basket for limiting downward movement of the basket and the pair at the right hand side of the basket for limiting upward movement of the basket.

When one set of toggles is operated to shift the basket a slight compression force is exerted on the stop members 75—77 (Fig. 7) at the opposite side of the basket. Thus, the force applied at one side of the machine is resisted to some extent at the other side. This is effective to take up all the play that may be in pivots 64, 66 and in the bearings of rock shaft 67.

The importance of the foregoing case shift control lies in the fact that the toggle linkage system is broken by power roll energy, whereby a mechanical advantage is realized and wear on the power roll is minimized. Furthermore, the movement of the type basket is rapid and positive under the influence of the breaking of the toggle linkage and the spring 63.

*Ribbon shift*

Figures 8, 9, 10:
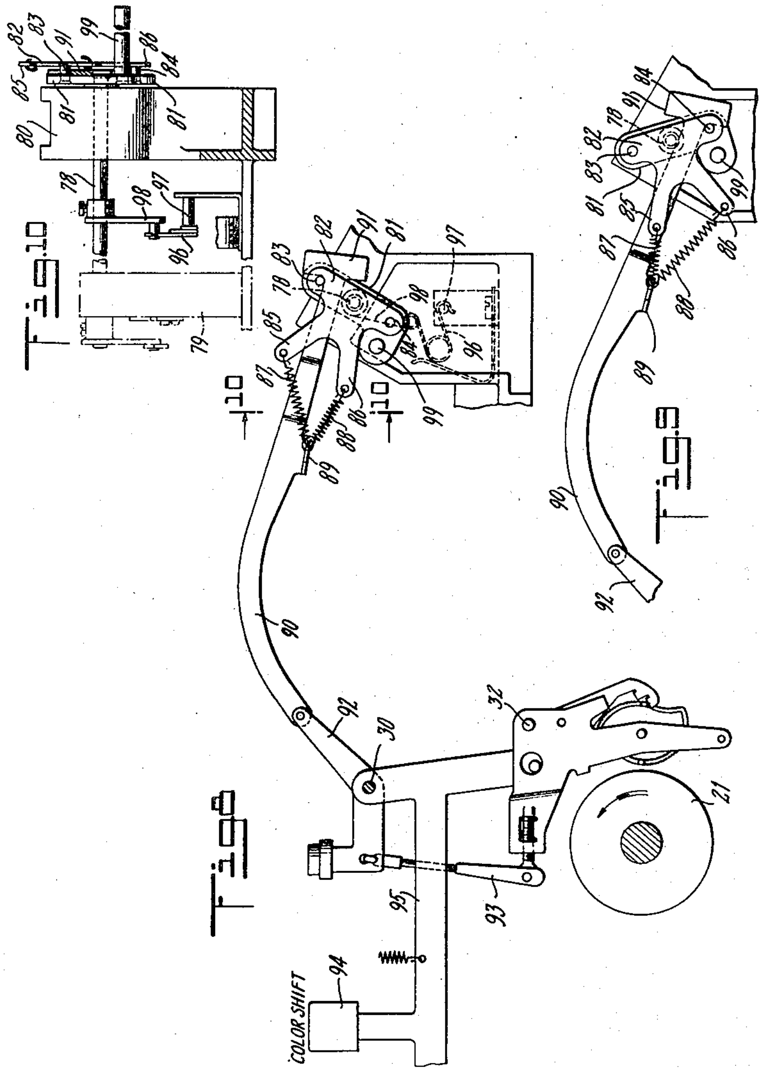
Fig. 8 is a detail view of the ribbon shifting mechanism.
Fig. 9 is a view of the mechanism at the right hand portion of Fig. 8, showing the elements in shifted position.
Fig. 10 is a view taken on line 10—10 of Fig. 8.

In order that the ribbon field or color may be shifted during automatic tape controlled operation of the machine, as to be pointed out hereinafter, there has been provided means herein for shifting the fabric ribbon by means of a key lever controlled cam. In this regard attention is directed to Figs. 8, 9 and 10 of the drawings. The machine is provided with conventional ribbon shift mechanism, but this mechanism has been placed under the influence of power cam mechanism. In Figs. 8, 9 and 10 a shaft 78 which is mounted for rocking motion in the power frame elements 79 and 80 is the shaft which is manually rocked in conventional writing machines for effecting color change or field shift of the writing ribbon. To the outer end of the shaft 78 has been fixed a rocker plate 81 which carries a control plate 82 in spaced relation in respect to the outer face thereof. Spacing pins 83 and 84 mount the control plate 82 in fixed relation to the rocker plate 81. The control plate 82 has a pair of forwardly extending diverging fingers 85 and 86, which serve to anchor one end of a pair of springs 87 and 88, the opposite ends of these springs being anchored at a common point in a laterally extending lug 89 carried by a lever 90. The rear end 91 of the lever 90 is T-shaped so that opposite ends of the T abut the spacing pins 83 and 84, respectively, depending on whether the lever 90 is shifted to an upper or a lower position under the influence of springs 87 or 88, respectively.

The forward end of the lever 90 is pivoted to an operating lever 92 which in turn is mounted for rocking movement on the rod 30. The other end of the lever 92 is connected by means of a link 93 to a cam unit adjacent to the power roll 21. It will follow, therefore, that upon depression of the color shift key 94 and its related key lever 95 which is pivoted for rocking movement on the rod 30, the associated cam unit will be released into engagement with the power roll 21, the cam unit will be rocked about the rod 32, and the link 93 will be operated to rock the lever 92 in a counterclockwise direction, thereby pulling forward on the lever 90 and applying operating force to either spacing pin 83 or spacing pin 84 depending on the position of the T-shaped end 91 at the time.

Assuming the rocker plate 81 to be disposed in the position shown in Fig. 8 of the drawings, the T-shaped end 91 of the lever 90 will engage the spacing pin 83 under the influence of spring 87. When the lever 90 is pulled forwardly as described, the T-shaped end thereof will urge the rocker plate 81 in a counterclockwise direction. A limited movement of the rocker plate 81 will cause the same to snap into its shifted position because of an overcenter spring 96 which influences its action. The spring 96 has one end thereof mounted on a fixed bracket 97 and the other end thereof on an arm 98 which is fixed to the shaft 78.

When the rocker plate 81 is shifted in a counterclockwise direction as viewed in Fig. 8, the spring 88 will shift the T-shaped end 91 of the lever 90 into contact with the spacing pin 84 so that it is conditioned to move the rocker plate in a clockwise direction upon a subsequent manipulation of the color shift key 94 and the operation of its associated mechanism. Fig. 9 of the drawings shows the rocker plate 81 shifted into the extreme position opposite from that shown in Fig. 8. In the position of the lever 90 as shown in Fig. 9, its T-shaped end 91 engages the lower spacing pin 84 whereby the T-shaped end 91 is conditioned to apply clockwise rocking motion to the rocker plate 81.

It will follow from the foregoing, therefore, that there has been provided herein simple and positive power mechanism for shifting the ribbon, and this is particularly important when it is desired to write text in more than one color by automatic operation of the machine under control of a record tape as to be described hereinafter.

A stub shaft 99 extends laterally from a face of the rocker plate 81 to a point that is accessible from the exterior of the machine for the purpose of permitting manual manipulation of the ribbon shift mechanism.

*Platen indexing*

Figures 11, 12:
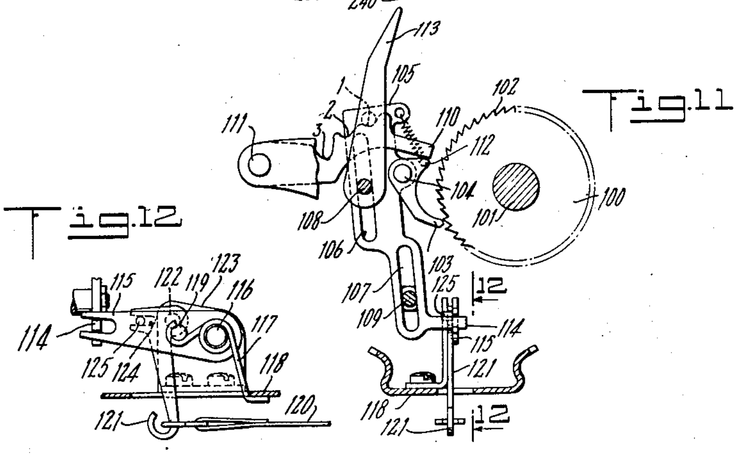
Fig. 11 is a detailed view of the platen indexing mechanism.
Fig. 12 is a view taken on line 12—12 of Fig. 11.

The writing machine platen is indexed about its longitudinal axis for the purpose of feeding the copy paper through the type impression zone by conventional mechanism which need, therefore, be only briefly described. In Figs. 11 and 12 is illustrated the mechanism by which the platen is indexed. The platen 100 is rotatably mounted on its axis 101 and has attached to one end thereof a ratchet wheel 102 which is adapted to be engaged by a feed pawl 103 for rotating the platen. The feed pawl 103 is pivoted on a pin 104, the pin 104 being carried by a sliding supporting member 105. The supporting member 105 has a pair of spaced slots 106 and 107 which embrace fixed guide studs 108 and 109, respectively. A finger 110 pivoted on the carriage frame at 111 has its free end resting on the top edge of the feed pawl 103. The upper edge of the finger 110 has a series of notches 1, 2 and 3 representing line spaces, and when a pin carried by the operating lever 113, which is mounted on the pivot pin 108, is moved into one of the line space notches 1, 2 or 3, the free end of the finger 110 bears on the top of the feed pawl 103 and alters the relation of the feed pawl 103 in respect to the ratchet wheel 102 by permitting the finger 110 to assume a different angular position under the influence of a tension spring extending from a point 112 on the pawl 103 to an anchorage on the member 105, thus adjusting the idle position of the pawl 103, so as to cause the feed pawl 103 to engage either every tooth, every second tooth or every third tooth of the ratchet wheel 102 in accordance with the setting of the hand lever 113.

The lower end of the support 105 has a laterally extending lug 114 which engages in the slotted free end of an operating lever 115. The operating lever 115 is pivoted on a fixed pivot stud 116 and is normally held in its raised position by means of a spring 117 which is wound about the pivot stud 116 and has one end thereof anchored to the carriage 118 and the other end to stud 119 extending from one face of the operating lever 115.

The platen indexing mechanism thus far described is operated through an indexing movement when the carriage is returned under the force of a carriage return tape 120. The end of the carriage return tape is attached to a downwardly projecting T-shaped lever 121 which is pivoted on a pivot stud 122. The studs 116 and 122 are carried by a fixed, upstanding bracket 123 secured to the carriage 118. One arm of the T-shaped lever 121 has a bifurcation 124 in which is received a pin 125 extending laterally from a face of the lever 115.

It will appear from the foregoing, therefore, that when the carriage is returned under the influence of the carriage return tape 120, the T-shaped lever 121 will be rocked in a counterclockwise direction about its fixed pivot 122 with the result that the bifurcated end 124 of the lever will move downwardly, and as a consequence of the connection between the bifurcation of the lever and the pin 125, the lever 115 will also be rocked downwardly, thereby drawing the supporting member 105 downwardly to the point where the slots 106 and 107 will engage with their upper extremities with the pins 108 and 109, respectively. Thereupon, in accordance with the setting of the control lever 113, the platen will be indexed 1, 2 or 3 line positions as the carriage is being returned.

*Variable spacing*

The machine is equipped with a standard carriage 126 (Fig. 13) and all of the spacing movements of the carriage are controlled by a rotary wheel escapement mechanism operated by the segment universal bar 41 (Fig. 15). Herein is disclosed proportional spacing mechanism wherein three differentially connected escapement wheels are used in combinations to provide from one to six units of spacing. The selection of the proper combination of operations of the three wheels is made for each character by three magnets EM1, EM2 and EM3 (Fig. 2), under the control of the code selector 13. Three contacts on the code selector control the lower case spacing and three other contacts on the code selector control the upper case spacing as will be pointed out hereinafter. Case shift contacts CSC (Figs. 4 and 5) operated when the type basket is raised and lowered select which of the two groups of the three code selector contacts are to be effective to control the three magnets EM1, EM2 and EM3. Spacing between words and the like is controlled by dummy or nonprinting type actions so that the same timing is retained as in printing.

Figure 14:
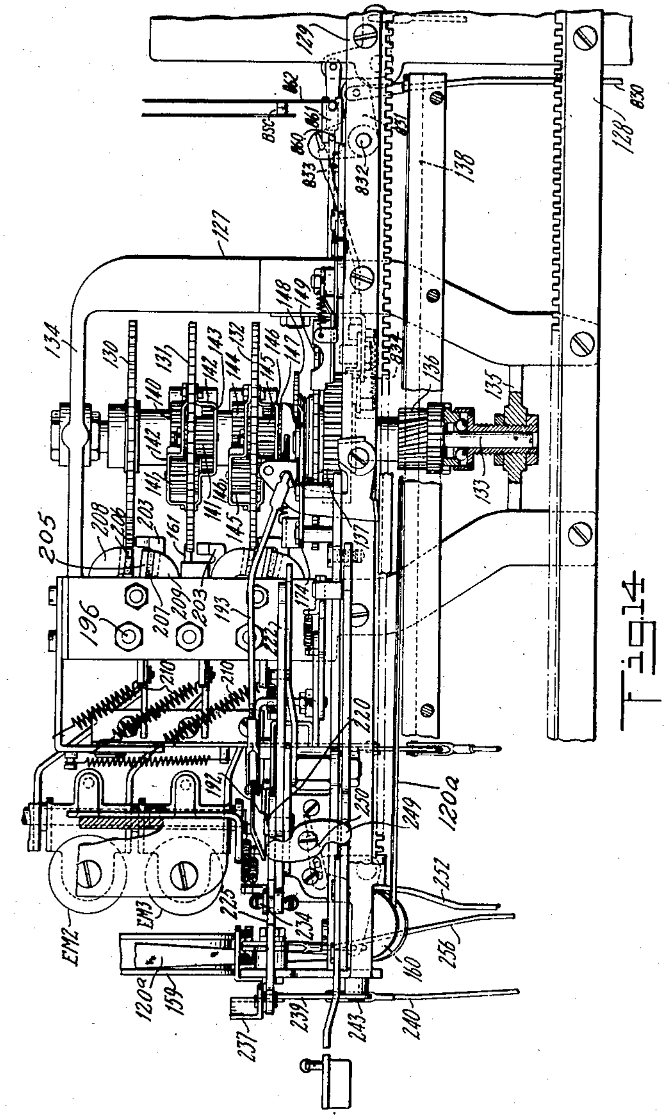
Fig. 14 is a plan view of the escapement mechanism.

The carriage escapement mechanism is designed to letter space in proportion to the width of the respective characters employed, and this mechanism is mounted in a frame casting 127 which is secured to the undersides of the front and rear rails 128, 129 (Fig. 14). The frame 127 supports three wheels which are designated 130, 131 and 132. A rod 133 on which the wheels 130, 131 and 132 are rotatably mounted is supported in parallel spaced frame members 134 and 135. A pinion 136 which is attached to a ratchet 137 meshes constantly with a spiral rack 138 which is secured to the underside of the carriage 118.

Figure 18:
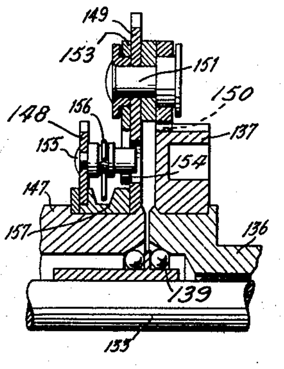
Fig. 18 is a sectional view on line 18—18 of Fig. 17.

The rear end of the pinion 136 is formed as a ball race (see Fig. 18) in cooperation with balls 139 whereby the pinion 136 and ratchet 137 rotate on the rod 133. The latter is relatively fixed in the frame members 134 and 135.

The hub of wheel 130 is integral with a pinion 140 located adjacent the hub of the wheel 131. The pinion 140 meshes with one of a pair of intermeshing sun pinions 141 rotatably mounted on bracket 142 carried by the wheel 131, while the other pinion 141 meshes with a pinion 143 which is secured to a pinion 144. The pinion 144 meshes with one of a similar pair of intermeshing sun pinions 145 mounted on brackets 146 carried by wheel 132, while the other pinion 145 meshes with a pinion 147.

Figure 17:
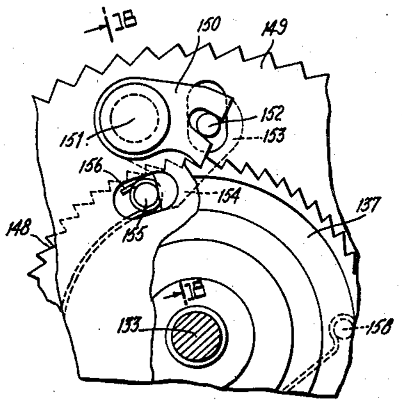
Fig. 17 is a large scale detail view of part of the carriage release mechanism.

Rotatably mounted on the pinion 147 is a ratchet wheel 148 which is of the same diameter as the ratchet 137; while secured to the pinion 147 is a ratchet 149 which is considerably larger in diameter than the ratchets 137 and 148. The ratchets 137 and 149 are normally connected for driving purposes by means best shown in Figs. 17 and 18, comprising a dog 150 pivoted on a stud 151 fixedly mounted on the ratchet wheel 149. The dog 150 normally engages the teeth of the ratchet wheel 147 whereby the ratchet wheel 149 will be rotated in a counterclockwise direction (Fig. 17) whenever the ratchet wheel 137 is similarly rotated by movement of the carriage. The dog 150 is slotted to embrace a stud 152 carried by a member 153 also pivotally mounted on the stud 151. The member 153 has a lug 154 engaging a stud 155 secured to the side of ratchet wheel 148. A torsion spring 156, hooked over the end of stud 155 and lying in a groove formed in a collar 157 on the pinion 147 and also anchored to a stud 158 (Fig. 17) on ratchet 149, normally tends to rotate the ratchet 148 in a counterclockwise direction (Fig. 17).

Movement of the carriage is effected, as usual in typewriting machines, by means of a spring drum 159 partly shown in Fig. 14 on which drum is wound a tape **120*a* passing over a pulley 160 mounted on the rear rail 129 and thence to the right hand end of the rack 138 at which point the tape 120*a* is secured to the carriage. Due to the constant tension produced in the tape 120*a* by the spring drum 159, the carriage 126 tends to move to the left. Thus the ratchet 137 tends to rotate the ratchet 149 and pinion 147 in a counterclockwise direction (Fig. 17). This rotational tendency of the pinion 147 is communicated to the wheels 130, 131 and 132 (Fig. 14) through the train of connections comprising the pinions 140, 141, 143, 144 and 145. Normally, however, this rotational tendency has no effect so far as movement of the carriage is concerned because the wheels 130, 131 and 132 are restrained from rotation by means of the loose dogs 161** (Fig. 16) of the escapement mechanism.

Reverse rotation of the ratchet 149 and pinion 147 is prevented by means of a dog 162 (Fig. 19) pivoted on a stud 163 carried by a plate 164 which is adjustably secured to the rear rail 129. Also pivoted on stud 163 is a bracket 165 having a bumper 166 composed of resilient material such as leather against which the dog 162 is normally held by a spring 167. The bracket 165 is adjustably rotated on the stud 163 until the free end of said dog 162 engages one wall of a tooth in the ratchet 149 but does not quite touch the other wall of the adjacent tooth, the object being to silence the clicking noise which ordinarily is experienced with similar ratchet-and-pawl mechanisms due to the end of the dog striking the side of the next succeeding tooth after riding over a given tooth.

The ratchet wheels 130, 131 and 132 have 54, 54 and 36 teeth, respectively, whereby the amount of feeding movement imparted to the carriage may be varied. Due to the method of interconnecting the ratchet wheels by means of intermeshing pinions, the ratchet wheels 130 and 132 rotate in a direction opposite to the ratchet 131. Assuming for the moment that the ratchet wheels 130 and 131 (Figs. 14 and 15) are fixed against rotation, the pinion 144 will be locked against rotation. Therefore, if ratchet wheel 132 is now permitted to rotate one tooth space, one of the pinions 145 will roll around said pinion 144 and by rotating the companion pinion 145 will permit the pinion 147 to rotate in the same direction as the ratchet wheel 132 but twice as much as ratchet wheel 132. Similarly, if the ratchet wheels 130 and 132 are locked against rotation and the ratchet wheel 131 is permitted to move, one of the pinions 141 will roll around the pinion 140 and cause pinions 143 and 144 to be rotated. The rotation of pinion 144 is communicated to pinion 147 through the intermeshing pinions 145. As in the case of ratchet wheel 132, pinion 147 rotates twice as much as ratchet wheel 131. However, when the ratchet wheels 131 and 132 are held against rotation and ratchet wheel 130 rotates, the same amount of movement will be communicated from the ratchet wheel 130 to the pinion 147 through the pinions 141, 143, 144 and 145 acting as idlers. It is possible, however, to permit the ratchet wheels 130, 131 and 132 to rotate in combinations to produce an accumulative effect upon the pinion 147 which, of course, will permit the carriage to move correspondingly.

Since the ratchet wheel 130 has fifty-four teeth, the pinion 147 and hence the pinion 136 will be rotated $\frac{1}{54}$ of a revolution whenever the ratchet wheel 130 rotates one tooth space. Moreover, since the movement of the pinion 147 is twice that of the ratchet wheel 131 and the latter has fifty-four teeth, the pinions 147 and 136 will be rotated the equivalent of $\frac{1}{27}$ of a revolution for one tooth space of the ratchet wheel 131. Likewise, the ratchet wheel 132 having thirty-six teeth, pinions 147 and 136 will be rotated $\frac{1}{36}$ of a revolution of the ratchet wheel 132. It will be seen, therefore, that the movements of pinions 147 and 136 produced by the ratchet wheels 130, 131 and 132 are so designed and the spacing of the teeth on their ratchet wheels has been so selected that ratchet wheel 130 causes the carriage to move one unit of spacing, ratchet wheel 131 two units of spacing and ratchet wheel 132 three units of spacing.

It is thus possible to secure six different spacings of the carriage which, in terms of units of carriage spacing, are as follows: 1, 2, 3, 4, 5 and 6. Thus the spacing of the carriage can be accommodated to the different widths of letters employed. The means by which the wheels 130, 131 and 132 are selectively controlled will be described in the following paragraphs.

Figure 16:
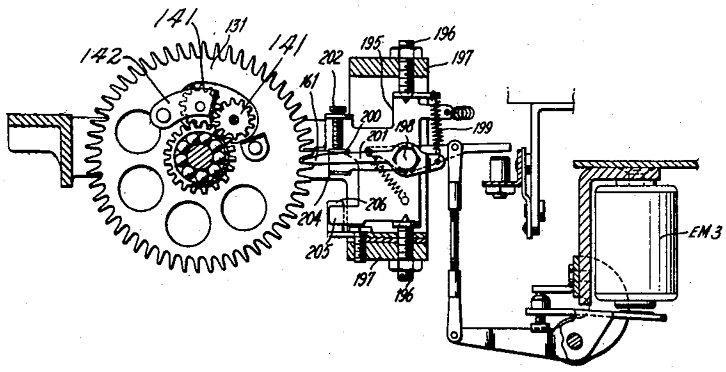
Fig. 16 is a vertical sectional view taken on line 16—16 of Fig. 15.

The rotation of the escapement ratchet wheels 130, 131 and 132 is controlled by means of three dog rocker mechanisms which are selectively controlled by magnets EM1, EM2 and EM3, respectively. Figure 16 shows the dog rocker mechanism for the ratchet wheel 131. Each dog rocker mechanism includes a dog rocker plate 195 which is pivotally mounted on vertically aligned conical studs 196 screwed into threaded holes in two parallel and horizontal portions 197 of the frame 127. The conical points of the studs are seated in conical holes in lugs formed in the dog rocker plate 195. Pivoted on a stud 198 carried by the rocker plate 195 is the usual loose escapement dog 161 mentioned hereinbefore which is actuated by a spring 199 so as to be urged in a counterclockwise direction (Fig. 16). The left hand end of the dog 161 engaging one of the teeth of the ratchet 131, however, is held in the position of Fig. 16 owing to the tension of the spring drum 159 (Fig. 14) being greater than the tension of the spring 199 (Fig. 16), whereby the dog 161 is forced against a stop 200 mounted on an arm 201 which is rotatably secured to the side of the rocker plate 195 by means of the stud 198. The upper left hand portion of the arm 201 is provided with a bent-over lug against which bears an adjusting screw 202 carried by a lug formed in the rocker plate 195. By turning the screw 202 in one direction or another, the arm 201 may be rotatably adjusted about the stud 198 as a pivot. The dog rocker plate 195 is provided with a lug 203 which is substantially in horizontal alignment with the left end of the dog 161, but does not normally engage the teeth of the ratchet wheel 131.

When the rocker plate 195 is rocked in a counterclockwise direction about the vertical axis of the studs 196 (Fig. 14), the lug 203 is moved into the tooth space occupied by the dog 161 before said dog is moved free of the ratchet wheel 131, whereby when the dog ultimately clears teeth in the ratchet 131, the ratchet wheel is permitted to rotate counterclockwise a fraction of a tooth space in Fig. 16. The spring 199 then rocks the dog 161 in a counterclockwise direction until said dog strikes a resilient stop 204 mounted on the arm 201. The stops 203 and 204 on arm 201 are so spaced that the end of dog 161 assumes a position in horizontal alignment with the next lower tooth space of ratchet wheel 131.

When the plate 195 is restored to the position of Fig. 14, the end of dog 161 is moved into the path of the next lower tooth on ratchet wheel 131 before the lug 203 clears the teeth in ratchet 131. When the lug 203 finally clears the teeth in ratchet 131, the ratchet wheel 131 will be permitted to rotate in a counterclockwise direction (Fig. 16) the remainder of a toothed space, thereby bringing the end of dog 161 back against the resilient stop 200. Thus, by giving the plate 195 one complete oscillation, the escapement ratchet 131 is permitted to turn one full tooth space.

The rocker plate 195 (Fig. 16) is formed with a lug 205 which extends between two resilient stops 206 and 207 (Fig. 14) mounted on adjustable arms 208 and 209, respectively, which arms are pivoted in scissors fashion on one of the conical studs 196. The stops 206 and 207 being located on opposite sides of the lug 205, adjustably limit the oscillatory movements of the plate 195 on the studs 196 as pivots.

Similar mechanism is provided for the other two ratchet wheels 130 and 132 but, owing to the fact that these two ratchet wheels rotate in a direction opposite to the ratchet wheel 131, the rocker plates 195 for the ratchet wheels 130 and 132 are in effect inverted with respect to the structure cooperating with ratchet wheel 131 which has been described. Normally, the plates 195 are held by torsion springs 210 with their lugs 205 abutting the stops 207, as shown in Fig. 14, with all of the dogs 161 engaging the teeth of their respective ratchets.

The rocker plates 195 are selectively and combinationally operated through power mechanism controlled by the keys 40 and the code selector mechanism 13 which will be described at a later point in this specification.

*Manual carriage release*

Figure 13:
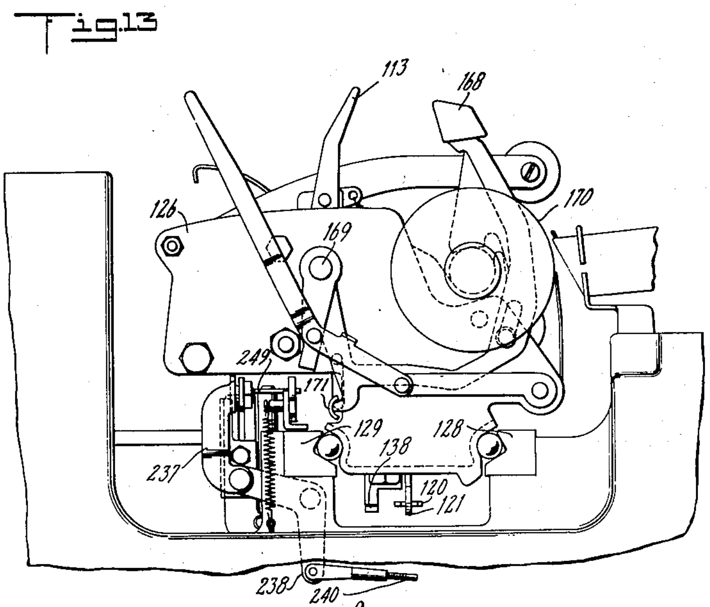
Fig. 13 is an end elevational view of the carriage.

It is desirable to be able to release the escapement mechanism from the carriage for the purpose of moving the carriage by hand, or when the carriage is to be returned by the usual power operated carriage return mechanism. For this purpose there is provided release mechanism which is operated by the usual carriage release levers 168, one of which is shown in Fig. 13, these levers being pivoted on studs 169 on the side plates of the carriage with the free ends of levers 168 adjacent the usual platen rotating knobs 170. Each lever 168 abuts one end of a bail 171 pivotally mounted in the side plates of the carriage. When either of the levers 168 is depressed, the bail 171 is rocked clockwise in Fig. 13 thereby causing the bail to move rearwardly of the platen. A lug 172 formed in a lever 173 (Figs. 19, 23, 24, 27 and 28), pivoted on the top surface of the rear rail 129, is engaged by a part of the bail 171 and is thereby moved rearwardly of the platen whenever the bail 171 is moved by the release levers 168 (i. e. from the position shown in Figs. 23 and 27 to that shown in Figs. 24 and 28).

Mounted on a stationary bracket 174 (Fig. 19) is a lever 175 pivoted on a stud 176 carried by the bracket 174. A release dog 177 is pivoted to the lower end of the lever 175 by means of a stud 178. A spring 179, anchored to one end of the dog 177 and to a leg 180 of the bracket 174, urges the dog 177 in a clockwise direction (Figs. 19, 23 and 24) and normally holds a pin 181 in the outer end of said dog against a stop notch 182 formed in the leg 180. Whenever the lever 173 is moved forwardly in Fig. 19 by the bail 171 as a consequence of the operation of one of the release levers 168, the dog 177 is moved to the left in Figs. 19, 23 and 24. By a clockwise pivotal movement of lever 175 on the stud 176 and a resulting movement of the dog 177, the ratchet 148 is moved in a counterclockwise direction relative to the ratchet 149 (Fig. 19).

Counterclockwise movement of the ratchet 148 as seen in the rear views of Figs. 19, 23 and 24 is a clockwise movement thereof as seen in the forward view of Fig. 17. As shown in Fig. 17, clockwise movement of the ratchet 148 carries with it the pin 155 (see also Fig. 18). This pin engages one side of the lever 153 and rotates this lever in a counterclockwise direction about its pivot 151 (Fig. 17). The lever 153 carries a pin 152 extending through an aperture in the ratchet 149 and being embraced in a bifurcation of the lever 150. This results in rocking the lever 150 counterclockwise (Fig. 17) about its pivot 151, so as to disengage the dog portion thereof from the ratchet 137. This permits the ratchet 137 and the gear 136 fixed thereto to rotate freely notwithstanding that the normal escapement mechanism is locked by the dog 162 (Fig. 19), so as to permit the carriage to be moved freely by hand or automatically without interference by the escapement mechanism. The same release means may be actuated by the power return mechanism for the carriage in a manner which will be later described.

*Carriage return*

The dog 177 is operated automatically whenever the usual power operated return mechanism operates to return the carriage prior to writing a new line. In the "International" electric writing machine, the carriage is returned by power mechanism very similar to the one described in Patent No. 2,294,722 under control of a carriage return key. This mechanism is not shown in any great detail in the present case, because it is not directly involved in the operation of the invention claimed hereinafter. It will suffice to say that when the carriage return key is depressed, a cam unit controlled thereby is operative to straighten the toggle which engages the carriage return clutch (Fig. 22) and, through a chain of connections including a link 183 (Fig. 19), a bell crank 184, and a link 185, rocks a lever 802 in a clockwise direction (Fig. 20*b*) about its pivot on a stationary pin 803. Also pivoted on the pin 803 is a lever 820 (Figs. 20 and 20*a*). The levers 802 and 820 are resiliently interconnected by a spring loop 821, which has one end anchored to a pin 822 fixed in lever 820 and the other end anchored to a stud 823 fixed in the lever 802. The lever 820 (Fig. 20*a*) carries rigid therewith a finger 870, from the face of which extends a stud 871. The stud 871 and a stud 852 extending from a lever 192 are interconnected by means of a loop 872. The lever 192 is pivoted upon a pivot pin 187. A link 193 extends from the outer end of the lever 192 to an outer end portion of the lever 173 (Figs. 23, 24, 27 and 28). Thus, when the link 185 is moved to the left as seen in Figs. 19 and 20, clockwise movement of the lever 802 (Figs. 20 and 20*b*) occasioned thereby causes the lever 820 also to move clockwise about the pivot 803, as seen in Figs. 20 and 20*a*. This action operating through the studs 871 and 852 and the loop 872 moves the lever 192 counterclockwise about its pivot 187 (Fig. 20*a*) and thus thrusts the link 193 to the left, as seen in Figs. 19 and 20*a*, rotating the lever 173 clockwise about its pivot, as seen in Figs. 27 and 28, and rocking the lever 175 (Fig. 19), so as to release the dog 150 from the ratchet 137 (Fig. 17) through the mechanism previously described and permit free movement of the carriage. During a carriage return operation, the ratchet 137 rotates in a clockwise direction (Fig. 17) whereby, if the dog 150 were not released, a clicking noise would result which is undesirable as it renders the operation of the machine noisy.

When the carriage approaches its left hand marginal position, the left hand marginal stop 190 (Fig. 19) strikes a hooked end 194 of the lever 189 and moves said lever 189 bodily to the left (Figs. 19, 27 and 28), whereby a linkage system and an associated cam is operated to disengage a carriage return clutch (Fig. 22) as will be explained in greater detail at a later point herein. The dog 177 is then restored by spring 179 to the position shown in Fig. 19.

As noted hereinbefore, the return of the carriage is under control of a friction clutch and carriage return tape reel on one end of the power roll drive shaft. This mechanism is illustrated in detail, Fig. 22. The toggle mechanism is operated by the carriage return cam controlled by its key lever, and the cam immediately returns to normal position even though the toggle may be locked in its straightened position to hold the clutch engaged. At the end of the carriage return movement, the carriage margin stop 190 engages and moves the lever on the frame which in turn trips the cam to furnish the power for disengaging the clutch by breaking the toggle. This provides a closer control of the carriage and allows the clutch to slip momentarily while the cam is operating to disengage the clutch, thereby permitting the rebound force of the carriage to be dissipated before the clutch is disengaged. The carriage return tape reel, the clutch and its operating toggle are shown in Fig. 22 of the drawings wherein an extension 21*a* of the power roll shaft is journalled for rotation in the side member of the frame casting 10. The shaft 21*a* extends laterally beyond the outer face of the frame casting 10 where it rotatably carries the carriage return ribbon reel 196*a*. Immediately adjacent to the reel 196*a* is a clutch disc 197*a* which is pinned to the shaft 21*a* for rotation therewith. In the normal non-operative position of the clutch, the adjacent face of the clutch disc 197*a* has little or no operative influence on the confronting flange 198*a* of the reel 196*a*. The opposite face of the clutch disc 197*a* is adapted for contact by an axially slidable plate 199*a* so that when pressure is applied to move the plate 199*a* inwardly against the clutch disc 197*a*, a driving connection will be established between the confronting faces of the clutch disc 197*a* and the flange 198*a* of the carriage return tape reel.

Clutching pressure is transmitted to the plate 199*a* through a sleeve 200*a*, the outer end of which is engaged by the end of a toggle arm 201*a*. The toggle arm 201*a* is pivoted to a downwardly extending leg 202*a* constituting a part of a bracket 203*a* which is attached to the outer surface of the frame casting 10. The toggle arm is pivoted to the downwardly extending leg 202*a* by means of a pivot stud 204*a*, this pivot being established near the lower end of the toggle arm 201*a*. The upwardly extending portion of the toggle arm 201*a* has formed therein a U-shaped portion 205*a*, the bight of which is threaded to receive an adjusting screw 206*a*. The extreme upper end of the arm 201*a* is notched to receive one end of a spring 207*a* which has its other end anchored to the frame casting 10. Thereby, the toggle arm 201*a* is retained in normal operative relation with a second link 208*a* of the toggle system, this link also having its lower end pivoted on the pivot stud 204*a*. The rear or upper end portion of the link 208*a* is embraced by the U-shaped portion of the toggle arm 201*a*, and the adjusting screw 206*a* bears against the upper end of the link. The link 208*a* has a laterally extending portion 209*a*, to which is pivoted one end of a short link 210*a*, the other end of said short link being pivoted to an arm 211 which is adapted to rock on a pivot pin 212. The arm 211 has a projecting finger 213 adapted to engage the laterally extending portion 209*a* of the lever 208*a* at a point below its pivotal connection with the short link 210*a*. As a consequence, the upward movement of the arm 211 is limited. An operating lever 214 is mounted to rock on the pivot stud 212, the pivot stud 212 being carried by an inwardly projecting portion 215 of the supporting bracket 203*a*. The operating arm 214 has a laterally extending flange 216 which is adapted to contact the upper edge of the inwardly extending bracket portion 215, thereby limiting the rocking motion of the operating lever 214 in a clockwise direction about its pivot pin 212. The arm 211 has an inwardly projecting flange 217 which underlies the bottom edge of the operating lever 214.

The operating lever 214 is provided at its inner free end with an eye 218, to which the cam controlled carriage return linkage is connected. Thus, upon operation of the carriage control cam, the operating arm 214 will be drawn downwardly, thereby rocking the lever 211 in a counterclockwise direction (Fig. 22) through engagement of the lever 214 with the inturned flange 217 of the lever 211. This will be effective to straighten the toggle connection between the lever 211 and the laterally extending portion 209*a* of the lever 208*a*. The lever 208*a* will consequently be rotated in a clockwise direction about its pivot 204*a* (Fig. 22); and by virtue of the previously described connection between the lever 201*a* and the lever 208*a*, the lever 201*a* will be rocked in a clockwise direction about its pivot 204*a*. This movement it will be observed is transmitted by the lower end of the lever 201*a* to the sleeve 200*a* and to the pressure plate 199*a* with the consequent coupling of the clutch disc 197*a* and the reel flange 198*a* to cause the reel 196*a* to rotate and wind the carriage return tape thereon.

The terminal member of the aforementioned stop lever linkage for disengaging by breaking the clutch toggle system is diagrammatically illustrated in Fig. 22 as a pivoted bell crank 219, the foot 219*a* of which is adapted to engage the bottom edge of the inturned flange 217 of the lever 211. It is clear from the foregoing description how the clockwise motion of the lever 211 about its pivot 212 (Fig. 22) will break the toggle system, thereby permitting the toggle arm 201*a* to move in a counterclockwise direction about its pivot 204*a* to release the clutch disc 197*a*. A more specific understanding of the several cam controlled operating linkage systems bearing on the engagement and disengagement of the clutch will be acquired as the description of the machine proceeds.

As intimated above, once the carriage return clutch toggle has been straightened and the clutch has been engaged for returning the carriage, it is necessary to provide means for breaking the clutch toggle and for disengaging the clutch. Herein the mechanism includes cam controlled levers and links shown in Fig. 25 of the drawings. When the hooked end 194 of the lever 189 (Fig. 19) is engaged by the margin stop 190, the lever 189 is moved bodily to the left as seen in Figs. 19 and 27 with the result that the end 249*a* (Fig. 27) of the lever 249 which is carried by the stub shaft 250 and which is engaged by a shoulder on the top edge of the lever 189, is moved and the lever 249 is rocked in a counterclockwise direction (Fig. 27). This causes the arm 251, which normally moves with the lever 249 (see Figs. 20 and 21), to be similarly rotated, thereby pushing the link 252 upwardly as seen in Figs. 27 and 28 or to the right in Fig. 25, thus rocking the trip lever 253 for the trip cam unit in a clockwise direction (Fig. 25). This causes the trip cam unit to be operatively coupled to the power roller 21. As a consequence the cam trip unit is rocked clockwise about the rod 32 (Fig. 25), thereby drawing down the link 254 and rocking the lever 255 in a clockwise direction. This draws the link 256 to the right in Fig. 25 and rocks the arm 257 (Fig. 26) in a counterclockwise direction (Figs. 25 and 26). The arm 257 is connected to a bell crank lever 800 (Fig. 20) which is pivoted on a fixed vertical axis. The opposite arm of the bell crank lever 800 has a link 801 pivotally connected thereto. The link 801 is pivotally attached to the lever 802 (Figs. 20 and 20*b*) that is pivoted on the pin 803. One end of the clutch release link 185 is also attached to the free end of the lever 802, the other end of the link 185 being pivoted to a bell crank 184 (Fig. 19). The bell crank 184 has pivoted thereto the rear end of the clutch release rod 183 (Figs. 19 and 22); and the opposite end of the release rod 183 is attached to the top of the bell crank lever 219 (Fig. 22). It will appear from the foregoing, therefore, that when the lever 189 (Fig. 19) is pulled to the left by engagement with the margin stop 190, the trip cam linkage (Fig. 25) is operated; and it, through the intermediate link and lever system, including bell crank 800, link 801, lever 802 and the clutch release linkage 183, 184 and 185, will pull rearwardly on the top of the bell crank lever 219 (Fig. 22) and rock it about its horizontal pivot to lift its forwardly extending arm 219*a* into engagement with the inturned flange 217 of the toggle lever. This will serve to rotate the toggle lever 215 about the pivot 212 in a clockwise direction (Fig. 22), thereby breaking the toggle link and permitting release of the clutch disc 197*a*.

*Tabulating mechanism*

The tabulating mechanism is best shown in Figs. 23 and 24. Pivoted on a stud 220 carried by a stationary extension 221 (Fig. 21) is a tabular lever or counter-stop 222 (Figs. 19 and 23), which extends horizontally parallel with the lever 189 (Fig. 19) and is provided with a tooth 223 normally out of the path of movement of the tabular stops 224. Also pivoted on the stud 220 is an operating lever 225 which has one arm extending almost straight downwardly and provided with a pin 226 which extends into the plane of the arm or lever 192 pivoted on the stationary pivot pin 187. The latter is carried by a bracket secured to the underside of the frame. A spring 229, connected to the arm 192 and to a fixed pin 230, holds the arm 192 in contact with pin 226. The arm 192 is connected by the link 193 to the lever 173 pivoted on the top of the rear rail (Figs. 27 and 28). The lever 173 cooperates with the edge of the arm 175 and is operated by the carriage release levers which are mounted in the carriage, heretofore described.

Whenever the arm 225 is rocked clockwise (Figs. 19, 23 and 24), the pin 226, engaging the arm 192, will cause the latter to rock counterclockwise, thereby pushing the link 193 to the left and operating the lever 173. The lever 173, in turn operates the arm 175 to disengage the pinion 136 from the escapement mechanism, this operation being required during tabulating operations in order to release the carriage for free running movement by the spring motor 159 (Fig. 14).

The lever 225 is resiliently connected to the lever 222, whereby the foregoing movement of lever 225 also causes the lever 222 to be rocked clockwise about the stud 220 (Fig. 19*b*) to elevate the lug 223 into the path of a tabular stop 224. For this purpose, the horizontal arm of the lever 225 has a short downward extension provided with a pin 232 connected by a spring 233 to a pin 234 on the lever 222. A guard plate 235 is loosely pivoted on the pin 234 and slotted to embrace the pin 232 and is placed between the extension of the arm 225 and the spring 233. Opposite the front or upper face of the lever 222 (see Fig. 21), there is provided a similar spring 233*a* which, with spring 233, causes the levers 222 and 225 normally to move in unison. If the tooth 223 should strike the lower edge of a column stop 224 when the lever 225 is rocked clockwise, springs 233 and 233*a* stretch and prevent damage to any of the parts.

The lever 225 is pivotally connected at 236 to a link 237 (Figs. 23, 24 and 25), having its lower end pivotally connected at 238 to a bell crank 239 (Fig. 25). The downwardly extending arm of the bell crank 239 is connected by a long link 240 to a rock lever 241 pivoted on the rod 30 which fulcrums the key levers including the tabulating key TK. The lever 241 is connected by a short link 242 to a conventional cam unit of the single-lobe type pivotally mounted on the rod 32. The cam unit cooperates with the power roller 21. The cam unit is controlled in a well known way by the tabulating key TK which, when depressed by the operator, causes the cam unit to be actuated by the power roller in a well known way, thereby rocking the cam unit in a clockwise direction. This results in drawing down the link 242, rocking the lever 241 clockwise, and drawing the link 240 to the right in Fig. 25, thereby rocking the bell crank 239 counterclockwise on its pivot 243. Link 237 is thus drawn downwardly, depressing the right hand end (Figs. 23 and 24) of the horizontal arm of the lever 225. The arm 192 is operated as described above to free the carriage from the escapement mechanism and, at the same time, the lever 222 is rocked clockwise to elevate the lug 223 into the path of the nearest stop 224 immediately to the left of the lug 223.

When operated in this fashion, the lever 225 is latched to hold the lug 223 in the path of the column stop 224. As best shown in Fig. 26, there is provided a latch 244 pivoted on a stud 245 carried by the frame extension 221 and urged in a clockwise direction by a spring 246 which is anchored to a bracket 247 secured to the frame extension 221. Normally the latch 244 bears against the rear face or side of the lever 225 but, when the latter is operated as described above (i. e. moved clockwise as seen in Fig. 23), the latch 244 snaps over the upper edge of the lever 225 and thereby prevents said lever from returning to the position of Fig. 23. When the lever 225 is rocked as described above, a spring 248 connected to the pin 226 and to pin 230, tends to restore the levers 222 and 225 as a unit to the position of Fig. 23 but the latch 244 prevents this from taking place. Thus, the counter-stop 222 is maintained in the operative position in the path of the column stop 224 until the movement of the carriage brings the column stop into engagement with the lug 223.

The lever 222 is slotted horizontally at the point where the stud 220 passes therethrough (see Fig. 19*b*) and normally the lever 222 occupies the left hand position as seen in Figs. 19, 19*a* and 19*b*. The lever 222 is held in this position by means which include the lever 249 (Figs. 21, 27 and 28) which is secured to the upper end of a stub shaft 250, this stub shaft being rotatably mounted in a horizontal portion of frame extension 221 (Fig. 21).

Fixed to the lower end of the stub shaft 250 is the arm 251 connected by the link 252 to the trip lever 253 pivoted on the rod 30 as aforesaid. Motion is transmitted as aforesaid from the lever 253 to the associated cam unit for causing power from the roller 21 to act through the parts 254, 255 and 256 to rock lever 257 counterclockwise as seen in Fig. 25. The lever 257 engages a bent-over lug 258 carried by the latch 244 to release this latch. A torsion spring 259 (Fig. 21) connected to the arm 251 and to a collar 260 secured by set screws to the shaft 250, tends to urge the shaft 250 and lever 249 in a clockwise direction with reference to Figs. 27 and 28, thereby holding lever 222 in its left hand position as shown in Fig. 19*b*.

When the column stop 224 strikes the lug 223, it moves the lever 222 bodily to the right in Fig. 28, thereby rocking the lever 249 in a counterclockwise direction (Fig. 28). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21 in a well known way. As a consequence, the trip cam unit is rocked clockwise, thereby drawing down the link 254 and rocking the lever 255 in a clockwise direction. This draws the link 256 to the right in Fig. 25 and rocks the arm 257 (Fig. 26) in a counterclockwise direction, also, through the lug 258, rocking the latch 244 to disengage it from the depressed horizontal arm of lever 225. This permits the levers 222 and 225 to rock counterclockwise (Fig. 23) under the influence of spring 248, thereby removing lug 223 from engagement with the column stop.

In light of the fact that the machine is designed to space units as small as 1/45 of an inch, it is of course quite important that carriage rebound upon tabulating movement thereof be minimized or avoided entirely. In order that the carriage rebound may be kept within very narrow limits, there has been provided a latch lever 810 shown in Figs. 19*a* and 19*b*. As shown in Fig. 19*a*, a bolt 813 is threaded into the stationary bracket extension 221. Surrounding this bolt and extending between the head thereof and the bracket extension 221 is an eccentric sleeve 811. The latch lever 810 is pivoted on a portion of this sleeve 811. The sleeve 811 also passes through an elongate aperture in the lever 189, permitting this lever to be moved bodily in a lateral direction as hereinabove described. Disposed between the lever 189 and the latch lever 810 is a hexagonal spacer 812. The free end of the lever 810 is formed with an upwardly opening hooked portion 814 which is positioned substantially flush with the upturned end of the lever 222. The hooked end of the lever 810 has an external surface 815 which engages the tabular stops 224, thereby camming the lever 810 downwardly against the tension of a spring 816 which interconnects the levers 222 and 810. As the carriage proceeds in its tabulating movement the tabulating stop 224 engages the upturned end 223 of the lever 222 and moves such lever to the right as viewed in Figs. 19*a* and 19*b*. This movement of the lever 222 exposes the hooked portion 814 of the lever 810 and permits such portion to engage behind the tabular stop 224 as the free end of the lever is drawn upwardly behind the tabular stop under the influence of the spring 816. It will be noted that under such conditions the hooked end 814 of the lever 810 engages one face of the tabular stop 224 while the outer upturned end 223 of the lever 222 engages the opposite face of the tabular stop 224. By this means the carriage is afforded positive security against movement in either direction once the tabulating operation has been effected. It follows, therefore, that any carriage rebound is effectively avoided.

The spring 816 causes the latch lever 810 to follow the movement of the counter stop lever 222 when the latter is rocked to engage the free end thereof with the tabulating stop 224. When the counter stop lever 222 is released, following a tabulating operation, engagement of the bottom edge of said lever with the stud 816*a* extending rearwardly from the face of the latch lever 810 will positively move the latch lever 810 out of the path of the tabulating stop 224.

In the normal operation of the carriage return there is a line spacing operation of the platen as hereinabove described. The return of the carriage involves the tripping of a carriage return cam and the operation of a carriage clutch release cam. Since in the carriage return structure heretofore described there is no provision for tripping the carriage return clutch release cam a second time, there has been provided special mechanism which permits successive line spaces under the control of the carriage return clutch without the accompanying movement of the carriage; withal, there has been provided means for releasing the carriage return clutch after each such succeeding line spacing operation without resort to the carriage return clutch release cam which is effective during the initial line spacing operation which takes place at the return of the carriage.

Reference to Fig. 20 will perhaps best illuminate the mechanism which is operative upon second and subsequent line spacing operations when the carriage is in its returned position. A lever 820 is pivoted adjacent to the lever 802 on the pivot pin 803. The downwardly extending leg of the lever 820 is connected to the lower end of the lever 802 by means of a spring loop 821 which has one end anchored to a pin 822 extending laterally from the lower end of the lever 820, and the other end of the spring 821 is anchored on a stud 823 extending laterally from the lower end of the lever 802. An upper leg of the lever 820 has pivoted thereto an angular shaped catch 824 which is normally held against a shoulder 825 formed in the upwardly extending portion of the lever 820, the force for holding the catch 824 in that position being provided by a spring 826 which has one end attached to the catch and the other end to a pin 827 extending laterally from the lever. The catch 824 has an inturned horizontal lip 828 which normally lies in the path of the margin stop 190. During the return of the carriage the margin stop 190 will engage the inturned lip 828 of the catch 824 and will rock the catch in a counterclockwise direction, thereby simply moving it out of the way so that the margin stop may engage the hooked end 194 of the lever 189 to effect operation of the carriage return clutch release cam as hereinbefore described. At such time the catch 824 will return to its normal position against the stop shoulder 825 and when in such position the horizontal lip 828 thereof will underlie the margin stop 190.

From the foregoing it follows that the lever 820 will be inhibited against rocking about its pivot pin 803. If, therefore, under such conditions the carriage return key is again depressed, the carriage return clutch will be engaged as heretofore described in connection with the return of the carriage. Since, however, the lever 820 is locked against movement, the carriage return clutch toggle linkage will be straightened under the influence of the carriage return control cam and the link 185 will be drawn to the left in Fig. 20 against the tension of the spring loop 821. At such time the carriage return clutch will be engaged and the tape reel 196*a* will be rotated sufficiently to effect a line spacing operation as hereintofore described.

The carriage return clutch toggle linkage will be broken immediately after its control cam has been operated by the expanding action of the bow spring 821 against the locked lever 820, this tending to move the lever 802 to the right in Fig. 20. The movement of the lever 802 results in drawing the link 185 to the right in Figs. 19 and 20 with the consequent operation of the finger 219 (Fig. 22) and the breaking of the clutch toggle linkage in a manner similar to that described in connection with the return of the carriage.

Back spacing of the carriage is under the influence of a back spacing cam which is not shown since it is identical in structure and function with the cams already described. Herein it is sufficient to say that when the back space key is depressed the associated cam will be released into contact with the power roll 21 and a link 830 (Figs. 14 and 19) will be drawn forwardly (Fig. 14). The link 830 is connected to a bell crank 831 which is mounted for rocking motion about a stud 832 supported in the rail 129. One leg of the bell crank 831 is connected to a link 833 and the latter has its opposite end connected to a ratchet 834 (Fig. 14) which is mounted on the casting 127 adjacent to the gear 137. Each time the linkage system now described is operated by its operating cam, the ratchet 834 is carried into engagement with the teeth of the gear 137 and moves said gear the space of one tooth in a retrograde direction to effect back spacing of the carriage.

The automatic control of the machine requires that certain control contacts be opened each time the carriage is returned or the carriage is back spaced. The contacts in question are the carriage return contacts CRTC (Fig.

19) and the back space contacts BSC (Fig. 14). By first referring to Fig. 19 it will be seen that the contacts CRTC are under the immediate control of a contact operator 850 which is under the influence of a stud 851 extending from a face of the bell crank lever 186, the lever 186 being pivoted on the pivot stud 187. The normal resilience of the movable leaf of the contact CRTC holds the contact closed and holds the lever 186 in its extreme clockwise rotative position. The lever 192 carries a pin 852 which engages the right hand edge of a portion of the lever 186 and which is effective, therefore, when the lever 192 is rocked in a counterclockwise direction about the pivot 187 during carriage return to rock the lever 186 in a counterclockwise direction also about its pivot 187, with the result that the contact CRTC is broken.

By reference to Fig. 14 of the drawings it may be observed how the contact BSC is opened during back spacing movement of the carriage. The bell crank 831 has a stud 860 extending from a face thereof and this stud engages and operates a contact operating link 861, one end of the link 861 being connected to the movable leaf 862 of the contact BSC. Each time, therefore, that the link 830 is drawn forwardly and the bell crank 831 is rocked about its pivot 832 in a clockwise direction, the contact operating link 861 will be moved to the right with the result that the contact BSC will be opened.

It has been generally stated hereinabove that during carriage return the lever 173 is rocked to disconnect the escapement clutch during such return movement. It is now possible to trace the specific mechanism by which this function is performed. The lever 820 (Fig. 20*a*) has a laterally spaced, generally rearwardly extending finger 870 from the face of which extends a stud 871. The stud 871 and the stud 852 extending from the outer face of the lever 192 (Fig. 20*a*) are interconnected by means of a loop 872. Consequently, when the connected levers 802 and 820 are rocked about the pivot pin 803 by movement of the link 185 to the left in Fig. 19, such motion is imparted to the lever 192 because of the pin and loop connection just mentioned. The lever 192 will rock about its pivot 187 in a counterclockwise direction, thereby moving the link 193 to the left in Fig. 19 and rocking the lever 173 into engagement with the lever 175 with the result that the escapement clutch mechanism is disengaged.

It is contemplated that the carriage return contact CRTC be opened also during tabulation and during extra line spacing operation when the carriage has been fully returned.

During tabulation it will be remembered the bell crank 239 (Figs. 23, 24 and 25) will draw the right hand end of the lever 222 downwardly through the lever 225, with the result that a downwardly extending portion 873 of lever 225 will be rocked in a clockwise direction. The free end of the downwardly extending portion of the lever 873 has a pin 226 which is adapted to engage the right hand edge of the lever 192, thereby rocking the latter lever in a counterclockwise direction and engaging the pin 852 thereon with the right hand edge of the plate 186. This will result in the counterclockwise movement of the plate 186 and the resultant opening of the contact CRTC through downward movement of the operating link 850.

Provision has also been made for opening the contact CRTC during extra line spacing operations when the carriage is in its returned position. In connection with such line spacing operations described before, it has been explained how the lever 820 is locked against movement by engagement between the latch 828 and the lower face of the margin stop 190. In such case only the lever 802 can be rocked about its pivot 803 and accordingly there has been provided a laterally spaced and generally downwardly extending finger 875 rigid with the lever 802. The finger 875 extends into the path of a pin 876 which is carried by and extends from the rear face of the plate 186. It follows, therefore, that when the lever 802 is rocked in a clockwise direction about its pivot 803 under the force of the link 185, the finger 875 of said lever will rock into engagement with the pin 876 and thereby rock the plate 186 about its pivot 187 in a counterclockwise direction, thereby opening the carriage return contact CRTC.

While a specific form of the instrumentalities employed in the machine has been described for purpose of illustration, it is contemplated that numerous changes may be made without departing from the spirit of the invention.

I claim:

1. In a type action for power operated typewriters, a pivoted power cam frame, a type bar operating member, an operating arm threaded into said cam frame to extend substantially radially from the pivot point of the cam frame, and an adjustable link connecting said operating arm with said type bar operating member and adapted to restrain said operating arm against turning in its threaded connection in said cam frame.

2. In a type action for power operated typewriters, a pivoted power cam frame, a sub-lever pivoted for rocking movement, a connecting link between a rocking portion of said power cam frame and said sub-lever, a screw threaded connection between said power cam frame and said connecting link for shifting the point of connection between said connecting link and said power cam frame, and means for adjustably varying the effective length of said link.

3. In a type action for power operated typewriters, a pivoted power cam frame, a type bar operating member, an operating pin threaded into said cam frame to extend substantially radially from the pivot point of the cam frame, and a link connecting said operating pin with said type bar operating member and adapted to restrain said operating pin against turning in its threaded connection in said cam frame.

4. In a type action for power operated typewriters, a pivoted power cam frame having a portion extending rearwardly from its pivot point, a pivoted lever, an adjustable rearwardly extending pin carried by said rearwardly extending portion of said power cam frame, a link, and pivotal connections between said link and said pin and lever.

5. In a type action for power operated typewriters, a pivoted power cam frame having a portion extending rearwardly from its pivot point, a pivoted lever, a rearwardly extending pin adjustably threaded in said rearwardly extending portion of said power cam frame, a link, and pivotal connections between said link and said pin and lever.

References Cited in the file of this patent

UNITED STATES PATENTS

| | | |
|---|---|---|
| 936,050 | Sholes | Oct. 5, 1909 |
| 1,600,252 | Smathers | Sept. 21, 1926 |
| 1,643,057 | Crumrine | Sept. 20, 1927 |
| 1,761,758 | Thompson | June 3, 1930 |
| 1,777,055 | Thompson | Sept. 30, 1930 |
| 2,217,179 | Mills | Oct. 8, 1940 |
| 2,315,744 | Smathers | Apr. 6, 1943 |